United States Patent [19]

Demmel

[11] Patent Number: 5,545,604

[45] Date of Patent: *Aug. 13, 1996

[54] PROCESSES FOR REACTING BASTNAESITE WITH ALKALINE-EARTH METALS

[75] Inventor: Edward J. Demmel, Newport Beach, Calif.

[73] Assignee: Intercat, Inc., Manasquan, N.J.

[*] Notice: The term of this patent shall not extend beyond the expiration date of Pat. No. 5,422,232.

[21] Appl. No.: 291,298

[22] Filed: Aug. 16, 1994

Related U.S. Application Data

[63] Continuation-in-part of Ser. No. 99,828, Jul. 30, 1993, Pat. No. 5,422,332.

[51] Int. Cl.⁶ .................................................. B01J 20/04
[52] U.S. Cl. .......................... 502/414; 502/302; 502/415; 502/524; 208/113
[58] Field of Search ............................. 502/9, 302, 414, 502/415, 524; 208/113

[56] References Cited

U.S. PATENT DOCUMENTS

| | | | |
|---|---|---|---|
| 3,835,031 | 9/1974 | Bertolacini | 208/120 |
| 4,153,534 | 5/1979 | Vasalos | 208/120 |
| 4,153,535 | 5/1979 | Vasalos | 208/120 |
| 4,206,039 | 6/1980 | Vasalos | 208/120 |
| 4,218,344 | 8/1980 | Vasalos | 252/455 |
| 4,221,677 | 9/1980 | Vasalos | 252/455 |
| 4,233,276 | 11/1980 | D'Souza et al. | 423/230 |
| 4,238,317 | 12/1980 | Vasalos | 208/120 |
| 4,267,072 | 5/1981 | Vasalos | 252/455 |
| 4,311,581 | 1/1982 | Baron et al. | 208/115 |
| 4,325,811 | 4/1982 | Sorrentino | 208/113 |
| 4,341,661 | 7/1982 | Baron et al. | 252/455 |
| 4,366,083 | 12/1982 | Baron et al. | 252/416 |
| 4,369,108 | 1/1983 | Berrolacini et al. | 208/120 |
| 4,369,130 | 1/1983 | Bertolacini et al. | 252/455 |
| 4,381,991 | 5/1983 | Bertolacini et al. | 208/113 |
| 4,405,443 | 9/1983 | Bertolacini et al. | 208/113 |
| 4,423,019 | 12/1983 | Bertolacini et al. | 423/244 |
| 4,471,070 | 9/1984 | Siefert et al. | 502/302 |
| 4,497,902 | 2/1985 | Bertolacini et al. | 502/65 |
| 4,642,177 | 2/1987 | Mester | 208/113 |
| 4,686,204 | 8/1987 | Mester | 502/406 |
| 4,728,635 | 3/1988 | Bhattacharyya et al. | 502/304 |
| 4,919,787 | 4/1990 | Chester et al. | 208/52 CT |
| 5,108,979 | 4/1992 | Magnabosco et al. | 502/304 |
| 5,371,055 | 12/1994 | Cormier et al. | 502/65 |
| 5,422,332 | 6/1995 | Demmel | 502/414 |

OTHER PUBLICATIONS

Alak Bhattachryya, Fluid Catalytic Cracking: Science and Technology, Studies in Surface Science and Catalysis, vol. 76, 1993, Elsevier Science Publishers B.V. (month unknown).

*Primary Examiner*—Michael Lusignan
*Assistant Examiner*—Timothy H. Meeks
*Attorney, Agent, or Firm*—Dorr, Carson, Sloan & Birney, P.C.

[57] ABSTRACT

Bastnaesite and magnesium-containing materials can be chemically reacted by use of reactions wherein alumina is made into a sol by use of a mono-protonic acid and then reacted with a magnesium-containing ingredient (e.g., magnesium acetate) and a bastnaesite ingredient such that, upon spray drying and calcination of the resulting composition, the bastnaesite is chemically reacted with magnesia to form a bastnaesite/magnesia/alumina compound having $SO_x$ activity.

50 Claims, 12 Drawing Sheets

SOx Cyclic Data for 300% Excess Magnesia, Mg/Al, 30% Bast.,2.6% $V_2O_5$ Material

PROCESSES FOR REACTING BASTNAESITE WITH ALKALINE-EARTH METALS

RELATED APPLICATIONS

This patent application is a continuation-in-part of U.S. patent application Ser. No. 08/099,828 filed Jul. 30, 1993, now U.S. Pat. No. 5,422,332 issued Jun. 6, 1995.

FIELD OF THE INVENTION

This invention is generally concerned with chemically reacting bastnaesite with alkaline-earth metals such as magnesium to form bastnaesite/alkaline-earth metal compounds. Some particularly preferred bastnaesite/alkaline-earth metal compounds made according to the herein described processes are further characterized by the fact they contain an alumina component as well as a magnesia component. These particular bastnaesite/magnesia/alumina compounds are, in turn, further characterized by their having magnesia/alumina ratios that are higher than those heretofore achieved in magnesia/alumina spinels. The chief utility of applicant's bastnaesite/alkaline-earth metal compounds follows from the fact that they are highly effective $SO_x$ additives.

BACKGROUND OF THE INVENTION

Re: Bastnaesite

Generally speaking, the term "bastnaesite" denotes a group of minerals that are chiefly comprised of fluorocarbonates of certain rare earth elements. However, the nomenclature used to describe these minerals is often rather loosely employed. For example, since the chief components of bastnaesite are rare earths, these minerals are sometimes referred to as rare earth oxides. They also are commonly referred to as "lanthanides." This term is obviously a corruption of the word lanthanum, which is the first member (or lowest atomic number member) of the lanthanide group of the Periodic Table. Those familiar with this art also will appreciate that the chemical symbol for lanthanum ("Ln") is commonly used to denote all of the lanthanides when they are considered as a group.

It also is common practice to refer to the various oxides of the lanthanides as LnO and to their oxyfluorides as LnOF. Given all of these considerations, it is quite common to designate the chemical makeup of bastnaesites, in general, by the formula: (Ce,La)OF, even though this mineral contains many other elements. For example, most bastnaesite minerals contain from about 65% to about 80% by weight of assorted rare earth elements (calculated as rare earth oxides). Their primary components are lanthanum and cerium, but they usually contain smaller proportions of various other rare earth elements such as praseodymium, neodymium, samarium, europium, and gadolinium. For example, chemical analysis of a typical bastnaesite mineral might show proportions of individual rare earth elements (calculated as oxides) to total rare earth elements (also calculated as oxides) within the general ranges: 45 to 55 wt. % $CeO_2$, 29 to 35 wt. % $La_2O_3$, 11 to 15 wt. % $Nd_2O_3$, 2.5 to 5.5 wt. % $Pr_2O_3$, 0.3 to 0.7 wt. % $Sm_2O_3$, 0.1 to 0.3 wt. % $Gd_2O_3$, 0.05 to 0.15 wt. % $Eu_2O_3$, and 0.05 to 0.35 wt. % of other rare earth elements.

Next, note that bastnaesite is a somewhat chemically reactive mineral. Consequently, it can be modified by relatively moderate chemical and/or physical treatment processes such as steaming, calcining, and acid leaching. By way of example of such a modification, bastnaesite ore is sometimes leached with strong acids to withdraw some or all of its strontium and barium content with which it is associated. Hence, for the purposes of this patent disclosure, the terms "bastnaesite" "treated bastnaesite" "bastnaesite mineral(s)" should be taken to include not only those raw mineral forms of bastnaesite found in nature, but also a wide variety of physically or chemically treated forms of such minerals.

Re: Use Of Bastnaesite as $SO_x$ Additive

Bastnaesite has an initial ability to chemically react with $SO_x$ under those conditions existing in a catalyst regeneration zone of a fluid catalytic cracking ("FCC") unit. Consequently, bastnaesite has been physically associated with various hydrocarbon cracking catalysts to catalyze oxidation of the $SO_x$ produced by regeneration of various hydrocarbon cracking catalysts. Bastnaesite also is known for its ability to absorb $SO_x$ gases. For example, U.S. Pat. Nos. 4,366,083 (the '083 patent), 4,311,581 (the '581 patent), and 4,341,661 (the '661 patent) teach $SO_x$ catalytic and/or absorbance activity of bastnaesite particles that are circulated in physical admixture with various hydrocarbon cracking catalysts.

However, this ability notwithstanding, bastnaesite particles have not been widely used as $SO_x$ additives because they are not easily regenerated under those conditions found in FCC regenerator units. That is, even though bastnaesite will readily pick up $SO_3$ gas during its initial trip through a FCC unit, the $SO_3$ is not readily driven away from the bastnaesite by any practical regeneration procedures. This phenomenon is often referred to as "aging" of $SO_x$ additives. Consequently, large initial amounts of bastnaesite (e.g., 15% of the bulk catalyst) must be used in a FCC unit; moreover, the bastnaesite supply must be heavily augmented as the material is repeatedly cycled through a FCC process. The resulting large proportions (e.g., 15% bastnaesite $SO_x$ catalyst and 85% hydrocarbon cracking catalyst) of non-hydrocarbon cracking catalytic material in a bulk, hydrocarbon cracking catalyst tends to destabilize and/or inhibit many hydrocarbon catalytic cracking processes. Hence, other $SO_x$ additives, which can be used in much lower, and hence less "disturbing" concentrations (e.g., 1% of the bulk catalyst), and which can be more readily "regenerated" (e.g., alumina, ceria, lanthanum, spinels impregnated with oxidation catalysts such as ceria, vanadia, etc., as well as alumina support materials impregnated with ceria, vanadia, etc.), have been used in preference to bastnaesite for most $SO_3$ absorption purposes.

The prior art also teaches a method for overcoming the fact that bastnaesite's initial $SO_x$ activity decays rapidly as it cycles through a FCC unit. For example, U.S. Pat. Nos. 4,642,177 ("the '177 patent") and 4,686,204 ("the '204 patent") teach that the aging problem can be alleviated by removing at least 50 percent of bastnaesite's fluorine content. This fluorine removal causes the bastnaesite to take on more of the character of cerium dioxide. Indeed, this defluorination process is carried to a point such that the '177 and '204 patents characterize their resulting materials as "a mixture of rare earth components derived from bastnaesite." In any event, the process described in these two patents serves to inhibit formation of those fluorine compounds thought to be responsible for the rapid aging of mineral bastnaesite's $SO_x$-capturing capability. These patents also teach that the improved $SO_x$ regenerability of these fluorine-depleted rare earth materials—relative to the mineral bastnaesite materials taught in the '083, '581, and '661 patents—can be enhanced by the impregnation of such materials with solutions of certain other metals (e.g., cobalt) that act as $SO_2 \rightarrow SO_3$ oxidation catalysts.

Next, note that none of the above-noted references teach methods whereby bastnaesite can be chemically reacted with other $SO_x$ catalysts with which it is associated. That is, under the broadest teachings of the '083, '581 and '661 patents, bastnaesite is employed in either of two ways: the bastnaesite particles are admixed with separate and distinct hydrocarbon cracking catalyst particles, but remain in the form of separate and distinct particle species in admixture with hydrocarbon cracking catalyst particles; or the bastnaesite particles are physically incorporated into matrices that are comprised of both hydrocarbon cracking catalyst particles and bastnaesite particles, in other words, the two different particle species are "glued" together by the use of binder materials to form a composite particle For example, the '083, '581 and '661 patents teach that crystalline alumino-silicate zeolite hydrocarbon cracking catalysts can be "glued" to bastnaesite particles through the use of various inorganic refractory oxide binder materials. Thus, the bastnaesite particles in these composite materials are physically dispersed in an overall particle comprised of distinct bastnaesite particles—and distinct alumino-silicate zeolite particles—that are bound together by a refractory oxide, matrix binder material.

Similar statements can be made about the rare earth components derived from bastnaesite à la the teachings of the '177 and '204 patents. That is, the rare earth components derived from bastnaesite can be mixed with hydrocarbon cracking catalysts and binder materials (e.g., inorganic refractory oxide components such as alumina) and impregnated with various oxidation catalysts (e.g., cobalt, vanadia, cerium, etc.), but they are not chemically reacted with these or any other such materials.

Re: Use of Metal Oxides as $SO_x$ Additives

Various metal oxides such as those described in U.S. Pat. Nos. 4,381,991 (the '991 patent), 4,836,993 (the '993 patent), and 4,369,130 (the '130 patent) have been employed as $SO_x$ absorbent/catalysts. In many cases these $SO_x$ additives are bivalent metal oxides such as those of alkaline-earth metals. Of these, magnesia is perhaps the most widely used. Alkaline-earth metal oxides are usually associated with certain well-known metallic $SO_x$ oxidation promoters. For example, the '993 patent teaches that sulfur oxides can be removed from a flue gas by an absorbent comprised of an inorganic oxide composition that has been associated with a cerium oxide, $SO_x$ oxidation promoter. The '993 patent also teaches that more complex inorganic oxide compositions such as $MgAl_2O_4$, spinel, mixtures of alumina and magnesium oxide, and mixtures of magnesium oxide and $MgAl_2O_4$ spinel can be associated with at least one free or combined rare earth selected from the group consisting of lanthanum, cerium, praseodymium, samarium, and dysprosium, which serve(s) as $SO_x$ oxidation catalysts.

Next, note that the chemical formula "$MgAl_2O_4$" used in the '993 patent is usually understood to mean "stoichiometric" spinel, as opposed to those spinels having magnesia or alumina proportions higher than that required for production of stoichiometric spinel. Those skilled in this art will appreciate that higher than stoichiometric proportions are sometimes found in that class of materials known as "solid solutions." Thus, spinels having proportions of magnesium (in the form of magnesia, MgO) higher than that called for by the stoichiometry of the compound $MgAl_2O_4$ are often referred to as "magnesia-rich" spinels. Similarly, spinels having higher than stoichiometric proportions of alumina ($A_2O_3$) are often referred to as "alumina-rich" spinels. Such magnesia- or alumina-rich spinels also have been referred to as "metal-containing spinels," that is spinels having a metal component (e.g., magnesia) above and beyond the amount of that metal needed to make stoichiometric spinel. The $SO_x$ absorbent abilities of such metal-containing spinels are taught in U.S. Pat. Nos. 4,469,589 (the '589 patent), 4,472,267 (the '267 patent), and 4,790,982 (the '982 patent).

Limitations Associated with Prior Art Spinel Catalysts Having High Magnesia-to-Alumina Ratios An extensive critical review of the absorbance of $SO_x$ by so-called "metal-containing spineis" (e.g., magnesia-rich spinels) is found in an article entitled: ADDITIVES FOR THE CATALYTIC REMOVAL OF FLUID CATALYTIC CRACKING UNIT FLUE GAS POLLUTANTS by Alak Bhattacharyya and Jin S. Yoo, Science and Technology, Studies in Surface Science and Catalysis, Col. 76, Elsevier Science Publishers (1993). This article is incorporated by reference into this patent disclosure and hereinafter referred to as "the Science and Technology reference." Dr. Yoo also is a co-inventor of the '589, '267 and '982 patents noted above. The Science and Technology reference teaches that the "extra" or "excess" metal in a magnesia/alumina spinel (the amount beyond stoichiometric requirements, e.g., the "excess" magnesia in a magnesia-rich spinel) must remain in the lattice of the spinel's crystalline structure in so-called "solid solution," as opposed to being so-called "free magnesium oxide" (magnesia that is not in the spinel's crystalline lattice, but rather that which merely constitutes a distinct phase of the overall material).

This reference also teaches that the "extra" magnesium that is put into such a spinel's lattice should not exceed by more than 100 percent, the amount of magnesia needed to make stoichiometric spinel. That is, when the material described by the formula $MgAl_2O_4+yMgO$ for a "magnesia-rich spinel" reaches an excess magnesia level wherein the y in the formula equals 1.0, the overall material has reached a level of 100 percent "excess" magnesia. This reference also emphasizes that if this 100 percent excess magnesia limitation is exceeded, the entire lattice structure of the resulting material collapses under the temperature conditions encountered in a FCC unit. Upon such collapse, the resulting material will have very poor $SO_x$ absorbent and/or regeneration qualities. In other words, this reference shows that in spinels containing up to 100 percent excess magnesia, only the magnesia that remains in solid solution with the spinel's crystalline lattice will be regenerable, and any magnesia that is merely in physical mixture with the spinel (and thus constituting a so-called "free magnesia" component of the overall material) will not be regenerable. Thus, in effect this reference teaches that any magnesia that is exsolved from a spinel lattice during use forms a species of magnesia that cannot be regenerated with respect to its $SO_x$ additive function. Again, such exsolvation occurs from these spinels when the amount of "excess" magnesia therein reaches 100 percent by weight of the magnesia in the material. The effect of this collapse with respect to $SO_x$ regenerability is very dramatically depicted in FIG. 12 (page 544) of the above-noted Science and Technology reference (note the dramatic falloff in $SO_x$ activity of magnesium-rich spinels at point "B" corresponding to 100 percent excess magnesia). Thus, the prior art usage of spinels as $SO_x$ additives has encountered a definite limitation as to the amount of "excess"

magnesia that can be accommodated in a spinel's lattice structure when the spinel is used as a $SO_x$ additive in a FCC unit. By way of contrast, applicant's bastnaesite/spinel-like compounds remain in forms wherein the spinel-like components of applicant's overall bastnaesite/spinel-like compounds can—and preferably do—contain from 100 to 300 percent "excess" magnesia. Moreover, any magnesia that is exsolved from applicant's compounds is very easily regenerated.

Other Problems Associated with $SO_x$ Catalytic Uses of Metal Oxide Materials

Again, various alkaline-earth oxide materials have, for many years, been employed as $SO_x$ catalysts, especially in petroleum refining operations. However, it is of considerable importance to a proper understanding of the scope of this patent disclosure to recognize that use of such materials for $SO_x$ catalytic and absorption purposes has had an "up and down" evolutionary development. At first, the $SO_x$ additive arts were encouraged by the ability of such materials to readily pick up the $SO_x$ components of flue gases. However, $SO_x$ components are picked up mostly in the form of their sulfates, e.g., $MgSO_4$. Unfortunately, such sulfates are not readily reduced back to their original forms for reuse (e.g., reducing $MgSO_4$ back to MgO). This problem was never adequately overcome and alkaline-earth metal oxides per se were eventually abandoned as $SO_x$ absorbents.

This phasing out of alkaline-earth metal oxides also was forced by purely physical considerations. These physical considerations revolve around the fact that $SO_x$ catalysts that are used in modern petroleum cracking operations must have a durable, attrition-resistant character. They also must have proper densities so they remain in homogeneous admixture with the bulk cracking catalyst particles. Indeed, $SO_x$ catalysts must be made with almost as much attention paid to their attrition resistance and density qualities as to their chemical composition.

Unfortunately, these purely physical requirements produced several problems with respect to use of magnesium oxide-containing catalysts in FCC units. For example, when increased $SO_x$ activity was pursued by the use of higher proportions of MgO in $MgO\cdot Al_2O_3$ systems, the hardness of the resulting material was greatly diminished. This follows from the fact that MgO is not particularly hard and, hence, not particularly attrition resistant. Consequently, under the severe attrition conditions encountered in fluidized beds, the prior art experienced unacceptably severe and rapid breakage of those $SO_x$ additive particles that contained relatively large amounts of magnesium oxide. The smaller particles resulting from such breakage are easily elutriated from an FCC unit. Such elutriation losses are very considerable in amount—and very costly in effect.

Indeed, it was in trying to solve such "physical" problems (making $SO_x$ additives having acceptable attrition resistance and particle density qualities) that applicant conducted a series of experiments, which originally were aimed at physically incorporating various more dense, attrition-resistant, but catalytically inert, ingredients into various alkaline-earth metal oxide $SO_x$ additive particles that eventually led to applicant's discoveries concerning how to chemically synthesize these materials. As a part of this experimental program, various materials having densities higher than those of such metal oxides were physically mixed with such metal oxide-containing materials (through the use of various matrix-forming materials) to raise the overall density of the resulting $SO_x$ additive particles. Bastnaesite was used as just such a density-raising component. In effect, relatively heavier bastnaesite particles and relatively lighter alkaline-earth metal oxide particles were "glued together" in the form of a composite particle held together by one or more known catalyst binder material(s) such as alumina so that the resulting composite particles would have a density better suited for homogeneous fluidization with typical zeolite hydrocarbon cracking catalysts.

Among other things, applicant's experimental program with respect to physically mixing bastnaesite with various alkaline-earth metal oxide ingredients served to show that the physical presence of bastnaesite in a catalyst particle's matrix can in fact raise the overall density of such a particle to desirable levels, but the program also showed that the mere physical presence of bastnaesite in the particle's matrix does not, on a sustained basis, improve the $SO_x$ absorbent ability of a bastnaesite/alkaline-earth metal oxide composite material. However, in seeking to find better ways of physically incorporating bastnaesite into such alkaline-earth metal oxide materials, applicant discovered certain processes whereby bastnaesite can be chemically reacted with the alkaline-earth metal-like ingredients (e.g., magnesia, calcium oxide, spinel, etc.), as opposed to merely being physically associated (as a mixture) with such alkaline-earth metal oxide-like materials.

Applicant then discovered that when bastnaesite is in fact chemically reacted with such ingredients to form the herein described bastnaesite/alkaline-earth metal oxide compounds, (as opposed to being just mixed with them) there is a very dramatic increase in the $SO_x$ absorbent and/or catalyzing ability of the resulting compounds. Applicant then discovered that in those versions of his bastnaesite/alkaline-earth metal compounds wherein the alkaline-earth metal component had a magnesia-rich, spinel-like character, the resulting material could hold "excess" magnesia far beyond the 100 percent excess limitation described in the Science and Technology reference with respect to magnesia/alumina spinels. Indeed, applicant found that bastnaesite/spinel-like compounds having up to about 400 percent excess magnesia maintained their $SO_x$ regenerability in extended use under FCC operating conditions. Generally speaking, applicant found that those of his bastnaesite/spinel-like compounds having from zero to 100 percent excess magnesia performed very well relative to other known $SO_x$ additives, but those containing between about 100 percent to about 400 percent "excess" magnesia performed even better. Within this range, those bastnaesite/spinel-like compounds having from about 100 percent to about 300 percent excess magnesia generally gave the very best performance on a sustained basis.

Having made these discoveries, applicant then embarked on a program aimed at comparing the $SO_x$ absorbent/catalytic abilities of his bastnaesite/alkaline-earth metal oxide compounds with: (a) various metal oxides alone, (b) stoichiometric spinel alone, (c) magnesium-rich spinels alone, (d) bastnaesite alone, (e) physical mixtures of bastnaesite and metal oxides, (f) physical mixtures of bastnaesite and stoichiometric spinel, and (g) physical mixtures of bastnaesite and magnesium-rich spinels (with each mixture considered both as mixtures of the different particle species and as mixtures of bastnaesite particles and spinel particles that were bound together in composite particles through the use of binder materials such as clays).

This experimental program also established that applicant's chemically reacted bastnaesite/alkaline-earth metal oxide compounds may be used to: (i) catalyze the oxidation of $SO_2$ to $SO_3$, (ii) absorb $SO_3$ formed by the $SO_x$ catalytic activity of the very same bastnaesite/alkaline-earth metal oxide compounds, (iii) absorb $SO_x$ formed by other separate and distinct $SO_x$ catalyst materials such as alumina particles provided with cerium and vanadium, and (iv) catalyze the oxidation of $SO_2$ to $SO_3$ so that such $SO_3$ can be absorbed by other kinds of separate and distinct catalysts such as alumino-silicate hydrocarbon cracking catalysts (and especially so-called "bottoms" cracking catalysts).

SUMMARY OF THE INVENTION

In their most fundamental aspects, the processes of this patent disclosure serve to chemically react bastnaesite with at least one alkaline-earth metal-containing material to ultimately form certain bastnaesite/alkaline-earth metal oxide compounds wherein the bastnaesite and at least one alkaline-earth metal-containing component are chemically reacted with each other. The compounds resulting from such chemical reactions, in turn, may be associated with other materials through the use of matrix-forming binder materials. These compounds are very useful as $SO_x$ additives in FCC processes. The alkaline-earth metal-containing ingredients taking part in such chemical reactions can be obtained from alkaline-earth metal-containing materials such as salts of such alkaline-earth metals, for example, the salts of magnesium (e.g., magnesium acetate, magnesium nitrate, magnesium oxide, etc.), and especially from magnesium salts used in conjunction with various alumina-containing ingredients such as alumina. Formulations containing magnesium in proportions in excess of those that, in conjunction with alumina, would otherwise produce stoichiometric spinel generally gave the best results.

Bearing in mind the previous discussions regarding the loose nature of the nomenclature associated with the term "bastnaesite" applicant will further identify the end product of his reactions through use of the generalized formula: $(Ce,La) OF/R^{2+}O$, or, in the special case of a bastnaesite/spinel-like compound, with the formula: $(Ce,La)OF/R^{2+}O \cdot R_2^{3+}O_3$, e.g., $(Ce,La)OF/MgO \cdot Al_2O_3$. In the same vein, the more preferred magnesium-rich products of applicant's processes can be described by the formula $(Ce,La)OF/R^{2+}O \cdot R_2^{3+}O_3 + yR^{2+}O$, wherein y is between about 0.01 and about 4.0 and most preferably between about 1.0 and about 3.0. Of all the materials that potentially fall within these definitions, bastnaesite/magnesia/alumina compounds (and especially those wherein the magnesia component is in "excess" of the requirements for production of stoichiometric spinel if not otherwise chemically reacted with bastnaesite, i.e., compounds having the formula: $(Ce,La)OF/MgO \cdot Al_2O_3 + yMgO$ wherein y is greater than zero) are most preferred.

One preferred processes for making the herein described chemically reacted, bastnaesite/alkaline-earth metal oxide compounds calls for: (1) dispersing a $R_2^{3+}[B]$ compound such as alumina ($Al_2O_3$) in a liquid medium (such as water) that also contains between about 0.5 and about 10.0 milliequivalents of a monoprotonic acid (e.g., nitric acid, formic acid, acetic acid, etc.) per gram of the $R_2^{3+}[B]$ compound to create a $R_2^{3+}[B]$ sol material (e.g., an alumina sol); (2) mixing a $R^{2+}[A]$ compound such as magnesia acetate with bastnaesite to form a bastnaesite/alkaline-earth metal compound (bastnaesite/$R^{2+}[A]$) and then mixing the resulting bastnaesite/$R^{2+}[A]$ compound with the $R_2^{3+}[B]$ sol material and thereby creating a bastnaesite/$R^{2+}[A]/R_2^{3+}[B]$ total reaction composition; (3) spray drying the bastnaesite/$R^{2+}[A]/R_2^{3+}[B]$ total reaction composition to produce a solid solution material; and (4) calcining the solid solution material resulting from the spray drying to produce a solid solution of bastnaesite, $R^{2+}$oxide (e.g., MgO), and $R_2^{3+}$ oxide (e.g., $Al_2O_3$) material. In other words, these processes ultimately produce a bastnaesite/$R^{2+}O/R_2^{3+}O_3$ compound, such as a bastnaesite/magnesia/alumina compound, having the generalized formula: $(Ce,La)OF/R^{2+}O/R_2^{3+}O_3$, and drive off, as gases, undesired elements such as those contained in the [A], [B], etc., components of the $R^{2+}[A]$ and $R_2^{3+}[B]$ ingredients, the mono-protonic acid and/or the material comprising the liquid medium (e.g., water) of the total reaction composition and thereby producing bastnaesite/alkaline-earth metal oxide materials (e.g, bastnaesite/MgO/$Al_2O_3$ materials) wherein the bastnaesite and at least one alkaline earth metal oxide-containing material (e.g., MgO) are chemically reacted with each other. As previously noted when the $R^{2+}O$-containing material (e.g., magnesia) is used in conjunction with alumina, the more preferred bastnaesite/magnesia, alumina resulting compounds may be described by the formula $(Ce,La)OF/MgO \cdot Al_2O_3 + yMgO$, wherein y is from zero (and therefore producing a stoichiometric spinel-like component in the overall compound) to about 4.0 and preferably between about 1.0 and about 3.0 and thus constituting a magnesia-rich spinel-like component of the overall bastnaesite/alkaline-earth metal oxide compound.

When the $R^{2+}[A]$ compound is a magnesium salt such as magnesium acetate, and the $R_2^{3+}[B]$ ingredient is alumina, one preferred process for making bastnaesite/magnesium oxide/alumina compounds according to this invention will comprise: (1) dispersing alumina in a liquid medium provided with between about 0.5 and about 10.0 milliequivalents of a mono-protonic acid per gram of alumina to produce an alumina sol; (2) mixing a magnesium [A] compound with the alumina sol and thereby creating a magnesium [A]/alumina gel; (3) mixing bastnaesite with the magnesium [A]/alumina gel and thereby creating a bastnaesite/magnesium [A]/alumina total reaction composition; (4) spray drying the bastnaesite/magnesium [A]/alumina total reaction composition to produce a solid material; and (5) calcining the solid material to produce a bastnaesite/magnesium oxide/alumina compound.

In another preferred embodiment of this invention, the presence of an aluminum-containing $R_2^{3+}[B]$ ingredient (e.g., alumina) in applicant's processes also can be employed in certain more specific procedures wherein (1) the alumina ingredient is dispersed in a water solution containing between about 3.0 and about 5.0 milliequivalents of a mono-protonic acid per gram of alumina, (2) mixing a magnesium-containing compound, and especially one wherein the magnesium ingredient is in true solution (e.g., as it is in magnesium acetate, magnesium nitrate, etc.) and a cerium-containing compound, and especially one wherein the cerium is in true solution (e.g., as it is in cerium nitrate, acetate, etc.) and a vanadium-containing compound, and here again, especially one wherein the vanadium is in true solution (e.g., as it is in ammonium meta-vanadate), with the alumina dispersion to form a gel, (3) adding bastnaesite to the gel, (4) spray drying the gel, and (5) calcining the product of the spray drying.

An even more preferred variation of this particular embodiment will be carried out by (1) dispersing alumina in a water solution containing about 3.0 milliequivalents of acetic acid per gram of alumina, (2) adding a first portion (e.g., about one-third) of the magnesia compound that is being employed in the overall process (e.g., magnesium acetate) to the bastnaesite ingredient and aging the resulting material for between 20 and 180 minutes, and preferably for least one hour, (3) adding the balance (e.g., about two-thirds) of the magnesium-containing, cerium-containing and vanadium-containing ingredients to the alumina to form a gel, (4) adding the bastnaesite/magnesium-containing, cerium-containing and vanadium-containing ingredient mixture to the gel, (5) spray drying the resulting gel, and (6) calcining the product of the spray drying.

Those skilled in this art will appreciate that, in the absence of applicant's bastnaesite ingredient, if a $R^{2+}$[A] ingredient such as magnesium acetate, magnesium nitrate, etc., is mixed with alumina, a spinel (e.g., $MgO \cdot Al_2O_3$ spinel) would be formed. Hence, in conjunction with a chemical reaction of these ingredients with bastnaesite, applicant's resulting material might be characterized as a bastnaesite/$MgO \cdot Al_2O_3$-like compound. Again, the term "spinel" has been very loosely used by the prior art. Thus, to deal with this terminology problem and to more precisely describe the resulting bastnaesite/alkaline-earth metal oxide compounds of this patent disclosure, applicant for the purposes of this patent disclosure intends the term "spinel" to mean that material whose X-ray diffraction pattern comports with the standard set forth in JCPDS powder diffraction file card number 21-1152 for $MgAl_2O_4$ spinel (note: JCPDS was originally the Joint Committee on Powder Defraction Standards, but has evolved into an organization known as the "ICDD" the International Centre for Defraction Data, 12 Campus Boulevard, Newtown Square, Pa. 19073). Conversely, applicant intends the term "spinel-like" material to mean those $MgO \cdot Al_2O_3$-containing compounds or bastnaesite/spinel-like compound components whose X-ray diffraction patterns do not comport with the one given by JCPDS powder diffraction file card number 21-1152 for $MgAl_2O_4$ spinel. Indeed, one would expect that even if the ingredients that would otherwise make a spinel comporting with this file card 21-1152 standard were chemically reacted with bastnaesite, the resulting compound would have an X-ray diffraction pattern that differs significantly from that standard. Applicant repeatedly found that this is indeed the case. Hence, applicant has chosen to use the term "spinel-like" to mean those instances when a material or compound component has the same general chemical ingredients (e.g., magnesia, alumina, etc.) but produces a significantly different X-ray diffraction pattern from that produced by compounds produced by reactions of magnesia and alumina.

Applicant also has found that the existence of these X-ray diffraction pattern differences produces compounds whose $SO_x$ absorbance and regeneration capabilities are far superior to those of materials (e.g., spinels) that are not characterized by the occurrence of a chemical reaction between applicant's bastnaesite and alkaline-earth metal-containing ingredients. This remains true for cases wherein a "spinel-like" material has magnesia/alumina proportions resembling those of stoichiometric spinel, or those of "magnesium-rich" spinel, and/or those of "aluminum-rich" spinels. Indeed, if these materials were not reacted with applicant's bastnaesite component, the resulting compounds would be "stoichiometric spinel," "magnesium-rich spinel, " or "alumina-rich spinel," and would not be nearly as good $SO_x$ additives as they are when their ingredients are chemically reacted with bastnaesite. Again, since applicant's magnesium-containing ingredients are in fact chemically reacted with bastnaesite, applicant has chosen to call the $MgO \cdot Al_2O_3$ component of his bastnaesite/$MgO \cdot Al_2O_3$ compounds "spinel-like" compounds or materials. Depending on the relative proportions of the magnesium and aluminum ingredients employed, the resulting compounds may be: (1) a bastnaesite/stoichiometric spinel-like compound (having a spinel-like component wherein the magnesia-to-alumina ratio is one to one, i.e., where there is no "excess" magnesia or "excess" alumina in the end product), (2) a bastnaesite/magnesium-rich, spinel-like compound (having a spinel-like component having "excess" magnesia in the spinel-like component's crystalline lattice), or (3) an alumina-rich, spinel-like compound (a spinel-like material having "excess" alumina in the spinel-like component's crystalline lattice). Again, bastnaesite/spinel-like compounds having spinel-like components with excess magnesia ranging from about 0.01 to about 4.0 times the amount needed to produce a stoichiometric spinel are preferred, that is, compounds having the general formula (Ce, La)OF/$MgO \cdot Al_2O_3 + yMgO$, where y is from about 0.01 to about 4.0, are preferred. Again, spinel-like compounds having excess magnesia ranging from about 100 percent to 300 percent (i.e., where y is from about 0.01 to about 3.0) are even more preferred.

One of the more surprising aspects of the present invention was applicant's discovery that if bastnaesite is chemically reacted with an amount of alkaline-earth metal (e.g., magnesium) that is in "excess" of that needed to make a stoichiometric spinel, then the resulting compound will—after a pass through a FCC system, or after a pass through a heating process such as a steam treatment that simulates the temperature conditions encountered in a FCC process—exsolve most of or even virtually all of the excess metal (e.g., excess magnesia) from the spinel-like component of the bastnaesite/spinel-like compound's lattice structure. Moreover, in very sharp contrast to the behavior of the spinels taught in prior art such as the Science and Technology reference, applicant's compounds revert during use (or by steaming before actual use in a FCC unit) to a state wherein the excess magnesia component of a magnesia-rich spinel is exsolved from the lattice of applicant's materials; moreover this occurs whether or not applicant's original ingredients provided less than or more than the 100 percent "excess" that was so crucial to the $SO_x$ absorbent capability of the spinels taught in the Science and Technology reference (see, for example, FIG. 12 of the reference for the dramatic effects of exceeding the 100 percent excess limit for such spinels by noting the dramatic decrease starting at point B in FIG. 12). In other words, applicant's products may be (1) a bastnaesite/stoichiometric spinel-like compound, (2) a bastnaesite/magnesium-rich, spinel-like compound wherein excess spinel is originally a part of the spinel-like component's crystalline structure, or (3) a bastnaesite/stoichiometric spinel-like compound/free magnesium oxide system (one wherein excess magnesium tends to reside outside of a stoichiometric crystalline lattice, as opposed to a bastnaesite/magnesium-rich spinel-like compound wherein the excess magnesia tends to reside inside of the spinel-like compound's crystalline lattice structure) and thus constitute a "magnesium-rich" spinel. Again, applicant's relative indifference on this point follows from the fact that after a trip or two through a FCC unit, or after suitable heat treatment (e.g., by steaming the products of applicant's production processes), all of applicant's original materials revert to forms wherein any "excess" magnesia, if any is in fact present, is exsolved from the crystalline lattice of applicant's bastnaesite/spinel-like compounds. Moreover, and in sharp contradistinction to the spinels taught in the Science and Technology reference, applicant has found that the best $SO_x$ absorbance and $SO_x$ regeneration results are obtained when in fact excess magnesia is exsolved from a bastnaesite/magnesia-rich, spinel-like compound by steaming or upon encountering the temperature conditions of a FCC unit. In other words, in contrast to the teachings of the Science and Technology reference, applicant obtained especially good results when his original systems contained more than 100 percent excess magnesia. Indeed, applicant's $SO_x$ additives performed to their highest levels when the "excess" magnesia was between about 51 percent and about 300 percent and especially after this excess was exsolved from a magnesia-rich, bastnaesite/spinel-like compound.

Identity Of Ingredients

Applicant's processes may employ a wide variety of starting materials. A list of such materials would include, but by no means be limited to, ingredients wherein: (i) the $R^{2+}$ alkaline-earth metal component is selected from the group consisting of magnesium, zinc, calcium, iron, and manganese (ii) the $R_2^{3+}$ metal component is selected from the group consisting of aluminum, cerium, iron, boron, manganese, lanthanum, and chromium, (iii) the resulting $SO_x$ additive particles also comprise at least one binder-forming material well known to the catalyst production arts (e.g., metal oxide binder materials such as silica/magnesia, silica/alumina materials), (iv) the bastnaesite material is selected from the group consisting of naturally occurring bastnaesite, treated bastnaesite (e.g., calcined, acid-leached, etc., bastnaesite minerals), (v) the mono-protonic acid is selected from the group consisting of formic acid, acetic acid, or nitric acid, and (vi) the liquid medium is selected from the group consisting of water, an alcohol, an ether, a ketone (specially acetone), and mixtures thereof. Again, when all is said and done, the most preferred $R_2^{3+}$ metal-containing component is alumina. It also should be noted in passing that particularly good results are obtained when the alumina ingredient is an alumina derived from alpha-alumina monohydrate.

The more preferred species of [A] anions associated with the $R^{2+}$ cations in the $R^{2+}[A]$ ingredient(s) can be selected from the group consisting of acetate, hydroxyacetate (which, incidentally, are each particularly effective anion species for the practice of this invention), oxide, nitrate, hydroxynitrate, ethylate, ethoxide, and mixtures thereof. The more preferred anionic [B] species associated with the $R_2^{3+}$ cation in the $R_2^{3+}[B]$ ingredient(s) can be selected from the group consisting of oxide, acetate, hydroxyacetate (which are particularly preferred), nitrate, hydroxide, hydroxynitrate, and mixtures thereof. Thus, some of the most preferred starting materials might include cation-anion combinations wherein the resulting $R^{2+}[A]$ compound is selected from the group consisting of $R^{2+}$ hydroxyacetate, $R^{2+}$ acetate, $R^{2+}$ nitrate, $R^{2+}$ oxide, $R^{2+}$ hydroxynitrate, $R^{2+}$ acetate, and $R^{2+}$ ethylate. Similarly, the $R_2^{3+}[B]$ compound can be selected from the group consisting of $R_2^{3+}$ hydroxyacetate, $R_2^{3+}$ acetate, $R_2^{3+}$ nitrate, $R_2^{3+}$ hydroxynitrate, $R_2^{3+}$ acetate, $R_2^{3+}$ hydroxide, $R_2^{3+}$ oxide, and the like. However, the most preferred $R^{2+}[A]$ compounds are magnesium [A] compounds (e.g., magnesium acetate, magnesium nitrate, magnesium hydroxyacetate, etc.) while the most preferred $R_2^{3+}$ [B] compounds are aluminum [B] compounds (e.g., alumina, and most preferably alpha-alumina monohydrate).

The most preferred mono-protonic acids for the practice of this invention can be selected from the group consisting of nitric acid, acetic acid and formic acid. Also note that in carrying out some of the more preferred embodiments of the herein described processes wherein a portion of the $R^{2+}[A]$ ingredient (e.g., magnesia) is separately reacted with bastnaesite and then added to a $R^{2+}[A]$/alumina gel, a di-protonic acid or tri-protonic acid may be used for certain hereinafter described "pH adjustment" purposes. Nonetheless, at least a portion of the acid employed to disperse an alumina ingredient—and preferably all of the acid used for this particular purpose—must be further characterized by the fact that it is a mono-protonic acid. Moreover, the mono-protonic acid must be used in amounts such that it provides an acid equivalency of from about 0.5 to about 10.0 milliequivalents of mono-protonic acid per gram of alumina. Amounts falling in the middle of this range, i.e., between about 3.0 and about 5.0 milliequivalents are particularly preferred. Either organic, mono-protonic acids or mineral, mono-protonic acids, or mixtures thereof, may be employed for applicant's alumina dispersion purposes. Those mono-protonic acids that do not tend to leave residues upon decomposing under the calcining conditions employed in the herein described processes are particularly preferred. It is for this reason that the two most preferred species of organic, mono-protonic acid are acetic acid and formic acid. For like reasons, the most preferred mineral, mono-protonic acid is nitric acid.

Milliequivalents of Acid Ingredients

Upon finding that the herein described processes are sensitive to the number of milliequivalents of mono-protonic acid per gram of alumina, as opposed to the pH per se of the alumina/water dispersion, applicant ran an experimental program aimed at defining the range of this acid equivalency parameter. This program established that use of from about 0.5 to about 10.0 milliequivalents of mono-protonic acid per gram of alumina gives the best overall results for a variety of aluminum-containing starting materials. Use of at least 1.0 milliequivalents and, even more preferably, use of about 3.0 milliequivalents of such acids gave particularly good results for a wide variety of ingredients, and especially for bastnaesite/magnesia/alumina systems.

As a further comment on the subject of the nature of the acid(s) that can be used in the herein described processes, it should be understood that the terms "pH" and "milliequivalents" ("meq") must be distinguished from one another for the purposes of this patent disclosure in so far as these terms relate to those materials of this patent disclosure where the $R_2^{3+}[B]$ ingredient is alumina. To make this pH vs. milliequivalent distinction, it may be useful to think of the term "pH" as meaning the concentration of hydrogen ions ($H^+$) per unit volume of acid. Next, note that, in many chemical reactions that are sensitive to pH conditions, it usually does not matter what source of $H^+$ ions is used to create a given "pH"; that is, it does not matter whether the "pH-producing" $H^+$ ions come from a mono-, di-, or tri-protonic acid source. This, however, is decidedly not the case with the processes of this patent disclosure.

For applicant's purposes, the concept of "milliequivalents" of acid from a mono-protonic acid source is all important, and within a very wide pH range, it does not particularly matter what pH is created by the use of the 0.5 to 10.0 milliequivalents of that mono-protonic acid (or acids) used to carry out applicant's alumina dispersion step. Also note that those aluminas that applicant prefers for the practice of this invention also are further characterized by the fact that they preferably have dispersibilities greater than 95 percent (and most preferably, greater than 98.5 percent) when from 0.5 to 10.0 milliequivalents of mono-protonic acid is used to disperse them. Within this range, the use of about 3.0 milliequivalents of such acid(s) produces especially good results in many systems.

To further illustrate this point, under the teachings of this patent disclosure, if a dispersible alumina were added to a solution having a pH of 3.0, there would be no clear understanding as to what would happen if the "valence" of that acid were not also known (i.e., if it were not known whether the acid that created the 3.0 pH was a mono-protonic, di-protonic, or tri-protonic acid). If the acid used to create the 3.0 pH were sulfuric acid, a typical di-protonic acid, the alumina would simply form a slurry and not the desired sol. That is, the alumina eventually would settle out and fail to create a material suited to the practice of this invention. On the other hand, use of an appropriate amount of a mono-protonic acid such as nitric acid would produce an alumina sol that in time would gel and, hence, be well suited for the practice of this invention. In other words, it should be understood that under the teachings of this patent disclosure, one could alter the pH of a total reaction mixture, or the pH of the alumina sol, by adding sulfuric acid, but still not produce a suitable total reaction mixture if an insufficient amount of mono-protonic acid were used (e.g., as was the case of the material produced by the procedures described in Example 7 of this patent disclosure, see also the XRD pattern for that material in FIG. 4 of this patent disclosure).

It also should be noted in passing that there are several commercially available alumina powders that are already provided with acid(s). Consequently, with those aluminas, which are already provided with mono-protonic acids, all one may have to do to make an alumina dispersion suitable for applicant's purpose is to add the overall alumina/acid material to a liquid medium such as water and stir. In other words, if the acid already accompanying the alumina is a mono-protonic acid, and if this acid happens to provide sufficient acid "equivalents" to carry out applicant's processes, these aluminas need only be mixed with a suitable liquid medium such as water. If not, the herein prescribed amounts of mono-protonic acid(s) will have to be added to the alumina dispersion.

However, once the alumina is properly dispersed through use of a mono-protonic acid, then various di- and/or tri-protonic acids may be used to adjust the pH of the dispersion and/or the total reaction composition. For example, once a given total reaction composition has been formed according to the teachings of this patent disclosure, the pH of that total reaction composition may vary all the way from about 2.0 to about 10.0; and this pH range may be achieved through use of a very wide variety of mono-, di-, or tri-basic acids. Indeed, even alkaline reagents can be used to make pH adjustments toward the alkaline end of this pH range.

Also note that in establishing these pH values, applicant generally found that if the pH of a total reaction composition falls below about 2.0, dispersed alumina particles tend to become dissolved into ionic forms. This is extremely detrimental to applicant's process and should be avoided. Note also that alumina sol systems tend to become very viscous at pH values between about 6.0 and 8.0, but then tend to become less viscous at pH levels between about 8.5 and about 11.0. Another point regarding the pH limitations associated with the herein described processes is that the upper pH limit (11.0 pH value) is more in the nature of a practical limit than a technical one. This follows from the fact that the most preferred alkaline reagent for the practice of this invention (if indeed one is used) is commercially available forms of ammonium hydroxide that usually have pH values ranging between about 11.0 and about 11.5. As a final note on such pH adjustments, it should be emphasized that certain metal-containing alkaline reagents such as sodium, lithium, or potassium hydroxide should not be employed to adjust the pH of any of applicant's reaction systems since their metal components tend to "poison" catalyst materials.

Next, note that because the H$^+$ ions needed to disperse alumina can be supplied by mono-protonic acids of differing acid species, and because each such acid species will have a different molecular weight, some further "internal adjustments" within applicant's 0.5 to 10.0 milliequivalent parameter will usually be in order based on certain other attributes of the mono-protonic acid. For example, the molecular weights of the most preferred acids used by applicant in dispersing alumina are found in TABLE I below:

TABLE I

| ACID | FORMULA | MOLECULAR WEIGHT |
| --- | --- | --- |
| Formic | HCOOH | 46 |
| Acetic | CH$_3$COOH | 60 |
| Nitric | HNO$_3$ | 63 |
| Hydrochloric | HCl | 36.5 |

Therefore, to supply the same number of H$^+$ ions from each of these different acid species, one would have to take into account the molecular weight of each acid. As a more specific example, it would require 60 grams of acetic acid to supply the same number of H$^+$ ions that are supplied by 46 grams of formic acid. Applicant also notes in passing that, in common chemical parlance, the molecular weight of such an acid is often regarded as an "equivalent" of acid; and if it is a mono-protonic acid, this amount is assumed to contain one equivalent of H$^{30}$ ions. Thus, quantitatively speaking, a milliequivalent of such an acid, at least for the purposes of this patent disclosure, could be thought of as the weight of mono-protonic acid ×1000/molecular weight of that acid. Thus, if one always uses the same acid, one might simply specify the grams of that acid per gram of aluminum in the alumina as an "equivalent amount" and a thousand times that as a "milliequivalent" amount of that acid.

Another point to note in regard to applicant's concern for the concept of "acid equivalency" (as opposed to pH) is the "strength" of an acid. Again, applicant's process is primarily dependent on the number of H$^+$ ions that are used to disperse the alumina ingredient and not with the pH of the dispersion per se. In this regard, another conceptual difficulty lies in the fact that acids differ in the degree to which they disassociate in solution. For purposes of illustration, one might consider two acids: acetic acid and nitric acid. The equilibriums set up between these two acids and their ions are as follows:

CH$_3$COOH$\rightleftharpoons$H$^+$+CH$_3$COO$^-$

HNO$_3$$\rightleftharpoons$H$^+$+NO$_3^-$

Next, note that one could have exactly the same number of milliequivalents of each acid, but since acetic acid is a so-called "weak" acid, a large proportion of its CH$_3$COOH component co-exists with the H$^+$ ion and the CH$_3$COO$^-$ (acetate ion). On the other hand, practically none of the HNO$_3$ of nitric acid co-exists with the H$^+$ ion and the NO$_3^-$ (nitrate ion); hence, it is regarded as a "strong" acid. Thus, for the same number of milliequivalents of acid, the nitric acid will supply more H$^+$ ions to the alumina than will be supplied by acetic acid. Unfortunately, there is no easy way of accurately quantifying this "strength" effect. Hence, for the purposes of this patent disclosure, applicant must rely upon the 0.5 to 10.0 milliequivalent parameter to define this aspect of the herein described processes and then make adjustments between the relative strengths of the possible mono-protonic acids that can be employed. In general, however, applicant has found that for the purposes of these processes, nitric acid and hydrochloric acid are usually about two or three times more effective than acetic acid in their ability to disperse alumina. That is, in performing this dispersion function, about 1 meq of nitric acid or hydrochloric acid gives about the same effect as about 2.0 to 3.0 meq of acetic acid. As yet another example, applicant has found that formic acid's ability to disperse alumina is somewhere between that provided by a "weak acid" (e.g., acetic acid) and a "strong acid" (e.g., nitric acid).

In dealing with dispersible aluminas, it is important to appreciate that the number of $H^+$ ions (and to some extent their concentration) not only influences the viscosity of the resulting sols, but also will, to varying degrees, influence the size of the clusters and the rate at which the resulting sols gel. And, as a final note with respect to the use of mono-protonic acid ingredients in these processes, applicant would point out that once the identity of the $R^{2+}[A]$ (e.g., magnesia) ingredient is established, the interaction of the particular materials with bastnaesite can be even further encouraged by use of certain specific mono-protonic acids. For example, applicant has established that acetic acid is particularly effective in creating bastnaesite/magnesia/alumina total reaction compositions.

Relative Proportions of Ingredients

Applicant's "primary reactive ingredients," e.g., $R^{2+}[A]$, $R^2{}_3+[B]$, bastnaesite ingredients, etc., will, most preferably, constitute from about 10 to about 50 weight percent of any given total reaction composition, i.e., the "wet" composition that is made up of the primary reactive ingredients plus the liquid medium and the acid ingredient(s).

Next, note that the relative proportions of these primary reactive ingredients, relative to each other, in the total reaction composition, will not equal the relative proportions of the same reactive ingredients in the end product materials, e.g., in the bastnaesite/alkaline-earth metal oxide particles. This discrepancy follows from the fact that the [A] component of the $R^{2+}[A]$ material (e.g., a magnesium material where [A] is an acetate) is converted to an oxide (e.g., MgO) in the final product by applicant's calcination step, and because the liquid medium and acid(s) are completely driven off during the spray drying and calcining steps. Be that as it may, the relative proportions of the ingredients in a given, wet total reaction mixture should be such that the bastnaesite component will, most preferably, comprise from about 5 to about 50 weight percent of end products of this entire process, that is, when said end products are in their "dry" (i.e., calcined) state (e.g., in the form of micro-spheroidal fluid catalytic cracking particles "MS-FCC particles"). The $R^{2+}O$ (e.g., the MgO, CaO, spinel-like component, etc.) of the overall bastnaesite/$R^{2+}O$ metal oxide final product will, if no other ingredients are used, constitute the entire remaining 50 to 95 weight percent of applicant's final dry product. Any optional $SO_x$ catalyst materials (such as cerium, vanadium, etc.) that may be associated with the final product (e.g., by inclusion in the total reaction mixture or by impregnation procedures) may be carried out after the dry product (e.g., FCC particles, fixed-bed pellets, etc.) is formed. These components will be used in proportions such that they, preferably, constitute less than about 15.0 weight percent and preferably between about 1.0 and 5.0 weight percent of said final dry product.

Again, the preferred proportion range for the bastnaesite component of the end products is preferably from about 5 weight percent to about 50 weight percent of the resulting bastnaesite/alkaline-earth metal oxide material in its dry, calcined state. Consequently, if the final product were a bastnaesite/spinel-like compound, the spinel-like component would constitute from about 50 to about 95 weight percent of the end product and the bastnaesite component would constitute from about 5 to about 50 percent of that end product. The most preferred amount of bastnaesite in most end products will usually be about 33 percent by weight, with the remaining spinel-like component being about 67 percent (neglecting the presence of other components such as ceria, vanadia, etc., oxidation agents, associated with end products as by inclusion in the total reaction mixture or by impregnation). When premixing the bastnaesite and $R_2O$ ingredient(s) (e.g., magnesia, spinel components such as magnesia and alumina, etc.) and especially when the magnesium compound is in the form of either its acetate or nitrate, applicant also prefers to pre-establish some desired ratio (such as the magnesia-to-alumina ratio in a spinel-like component) of the final product and then obtain that ratio in the end product by premixing from about 5 to about 50 percent of the total magnesium employed with the bastnaesite. The resulting magnesia/bastnaesite composition is then added to a composition comprised of an aluminum compound (e.g., alumina). The remaining magnesium compound is then added to that composition to provide the final desired ingredient proportions.

Other more specific variations on these processes also were established. For example, applicant found that by choosing the proper amount of milliequivalents of acid per gram of alumina in preparing certain alumina sols, the otherwise preferred step of separately reacting bastnaesite with the Mg[A] compound (e.g, magnesium acetate, hydroxyacetate, etc.) can be completely eliminated. In any case, the most preferred composition ranges that applicant arrived at as "norms" for the herein described $SO_x$ catalysts that use magnesia, alumina and a supplemental $SO_x$ catalyst (such as vanadia or ceria) are given in TABLE II.

TABLE II

| | WEIGHT PERCENTAGES | | |
|---|---|---|---|
| | Low | Optional | High |
| Magnesia | 20 | 30 | 50 |
| Alumina | 25 | 39 | 50 |
| Bastnaesite | 5 | 33 | 50 |
| Vanadia | 2 | 3 | 5 |
| Ceria | 0 | 6 | 15 |

And, as yet another note on the subject of relative proportions, applicant would point out that, in general, the mono-protonic acid ingredient(s) of the herein described processes will comprise only from about 1.0 weight percent to about 10.0 weight percent of a given total reaction mixture to provide the 0.5 to 10.0 milliequivalents of acid needed to properly disperse an alumina ingredient. In any case, virtually all of these mono-protonic acids will likewise be substantially driven off by applicant's calcination step. This 0.5 to 10.0 weight percent range for the mono-protonic acid does not, however, take into account any acid used to create certain soluble magnesia compounds such as magnesium acetate that may be employed to create a Mg[A] material wherein the magnesium is in true solution. Here again, however, any acetate components of such acids would be all but completely driven off during applicant's calcining step.

Any optional ingredients used to enhance the manufacturing process (e.g., viscosity agents, gas evolution agents, etc.), if indeed any are used, should be no more than about 25 weight percent of a given total reaction mixture. More preferably, such optional production ingredients, if used, will constitute less than about 10 weight percent of a total reaction mixture. For the most part, those optional ingredients used to enhance the manufacturing process also will be almost completely driven off by applicant's spray drying and calcination steps.

Viscosity agents may be used to help "freeze" the ingredients of the homogeneous distribution present in the original total reaction composition while the total reaction composition is undergoing the volatilization associated with applicant's spray drying step. In effect, such viscosity agents serve to inhibit the process reaction kinetics by raising a reaction mixture's viscosity and thereby decreasing the mobility of the reactive ingredient species while they are totally suspended in the liquid phase of the total reaction composition. In other words, such materials can provide those total reaction compositions that are undergoing volatilization with a better opportunity to form a solid matrix before any undesired chemical reactions can take place. Starch and/or gum arabic are particularly preferred viscosity agents for this purpose. A wide variety of known gas evolution agents can likewise be added to the total reaction composition to encourage evolution of gases (e.g., those formed from the [A] and [B] ingredients) during calcination. Again, these viscosity agents and/or gas evolution agents will be driven off by applicant's calcination step.

The liquid medium will constitute most of the remaining 50 to 90 weight percent of applicant's total reaction compositions. That is, the liquid medium will most preferably constitute 50 to about 90 percent of the total weight of: (1) the primary reactive ingredients (e.g., bastnaesite, magnesium acetate, alumina, etc.), (2) binder materials (e.g., clays, metal oxides as alumina), (3) mono-protonic acid(s), (4) oxidation catalysts such ceria, vanadia, etc., and (5) the liquid medium itself (e.g., water, alcohol, etc.). Thus, for example, a total reaction mixture containing 40 percent by weight of reactive ingredients, e g., $R^{2+}$[A] alumina, bastnaesite, etc., and 10 percent by weight of acid would, according to applicant's preferred proportions, contain 50 percent by weight of a liquid medium such as water, alcohol, etc. Again, making adjustments for the fact that most of the acid, most of the volatile optional ingredients (e.g., gas evolution agent(s), viscosity agent(s), etc.), and virtually all of the liquid medium are volatilized by the spray drying and calcination steps of applicant's processes, a "wet" total reaction system having 90 percent volatile liquids and 10 percent non-volatile materials (e.g., bastnaesite, magnesia, alumina, clay, etc.) would produce a "dry" (i.e., calcined) end product compound wherein the 10 percent of non-volatile components would constitute essentially 100 percent of said dry end product.

By way of yet another clarifying example of the effects of "drying" one of applicant's total reaction mixtures, an original total reaction mixture comprised of say 10 weight percent of volatile, optional ingredient(s), 10 weight percent bastnaesite, 40 weight percent alkaline-earth metal ingredients, and 50 percent water (which includes minor amounts of acid) would calcine to a final "dry weight" product that is a bastnaesite/alkaline-earth metal compound comprised essentially of about 20 percent of a bastnaesite component and about 80 percent of an alkaline-earth metal oxide component.

Spray Drying Operations

Applicant's spray drying operations can be done by techniques well known to the catalyst production arts (e.g., those disclosed in U.S. Pat. No. 5,108,979 could very well be employed) to produce particles that can be used in the herein described FCC processes. For example, such spray drying could be used to produce particles having a range of sizes such that essentially all such particles will be retained by a standard U.S. 200-mesh screen and essentially all such particles will be passed by a standard U.S. 60 mesh screen. Other physical forms of the end products (e.g., relatively large particles or pellets) are generally less preferred but may have utility in certain select cases, e.g., when the end product is not used in fluidized catalytic processes.

Optional Drying Procedures

Note also in addition to a spray drying step, applicant's overall process may be enhanced by use of a separate and distinct drying step that is carried out after the drying that naturally results from the spray drying step. Such additional drying may serve to better "freeze" the ingredients in a homogeneous state in which they originally existed in the total reaction composition. This additional drying will further serve to remove any remaining traces of the liquid medium that may be still present in the interstices of the particles and/or associated with the particulate product of the spray drying step (e.g., associated as water of hydration). Drying times for this distinct drying step will normally take from about 0.2 hour to about 24 hours at temperatures that preferably range from about 200° F. to about 500° F. (at atmospheric pressure) but, in all cases, at temperatures greater than the boiling point of the liquid medium employed (e.g., greater than 212° F. for water).

Calcining Procedures

After such drying and desiccation steps (if a separate desiccation step is employed) it remains only to take the solid matrix of the anhydrous particles produced by the spray drying step and convert the $R^{2+}$, $R^{3+}$, etc., components of the $R^{2+}$[A], $R_2^{3+}$[B], etc., ingredients to their oxide forms, e g., $R^{2+}$O, $R_2^{3+}O_3$, etc., by calcination procedures well known to this art. In effect, the calcination step serves to drive off the [A] and [B] components and replace them with oxygen and thereby produce a final product having only the oxide forms of the $R^{2+}$, $R_2^{3+}$, etc., ingredients. The calcination step also serves to drive off, as gaseous oxides, all but the "desirable" components of the resulting bastnaesite/alkaline-earth metal oxide materials. For example, this calcination step will drive off the liquid medium and the mono-protonic acid, as well as most viscosity agent and/or gas evolution agent components of a total reaction mixture. Such calcination is readily accomplished by heating the products of the spray drying step (or of the optional desiccation step) at temperatures ranging from about 1,000° F. to about 2,000° F. (preferably at atmospheric pressure) for from about 60 minutes to about 240 minutes, and most preferably at about 1,350° F. for about 180 minutes. The catalyst particles should not, however, ever be raised to their melting temperatures.

Steaming Procedures

Applicants also have found that steaming procedures can be used to exsolve "excess" magnesia that may be in the lattice structure of certain bastnaesite/magnesia-rich, spinel-like compounds. FIG. 9 depicts the XRD pattern for such a "steamed" $SO_x$ additive and FIG. 10 shows its TGA performance. In effect, such steaming procedures generally serve to convert any magnesia-rich, spinel-like components of a bastnaesite/magnesia-rich, spinel-like compound, which were created by the original chemical reactions of this process, into a bastnaesite stoichiometric spinel-like phase and a bastnaesite exsolved magnesia phase. As previously discussed, if, for example, "excess" magnesia were originally placed in applicant's bastnaesite/magnesia-rich, spinel-like material, most of (and perhaps all of) the "excess" magnesia in the lattice of the spinel-like component of the bastnaesite/spinel-like compound would be exsolved from said lattice of the spinel-like component by the heat conditions encountered in a FCC unit or by a heating (e.g., by steaming) step applied to the end product materials of the herein described processes. Such a heating or steaming procedure is, however, optional because the first trip of the $SO_x$ additives of this patent disclosure will likewise serve to exsolve any excess magnesia from the lattice structure of magnesia-rich, bastnaesite/spinel-like compounds.

Other variations of the herein described processes may include: (1) use of nonorganic thickening agents such as alumina (i.e., alumina used in addition to that alumina that may otherwise employed in say a magnesia, alumina, etc./ bastnaesite total reaction composition), (2) adjustment of the solids content of a reaction composition before it is fed to a spray dryer, and (3) aging of the $R_2^{3+}O_3$ sol (e.g., alumina sol) before said sol is reacted with the other ingredients.

Finally, various metallic compounds known to have $SO_2 \rightarrow SO_3$ catalytic activity, such as those of vanadium, cerium, platinum, etc., also can be associated with the bastnaesite/alkaline-earth metal compounds produced by the processes described in this patent disclosure. For example, this association can be achieved by adding such materials directly to the main "reactive ingredients" (e.g., $R^{2+}[A]$, $R_2^{3+}[B]$, and bastnaesite) in the total reaction mixture existing before applicant's spray drying procedure is carried out. They also can be associated with the herein described compositions by impregnating the products of applicant's processes after they are formed, or by forming composite particles comprised of ceria-containing, vanadia-containing, etc., particles and bastnaesite/alkaline-earth metal particles that are "glued together" through use of various catalyst binder materials well known to the catalyst production arts. Of these possibilities, procedures wherein such metallic compounds having $SO_x$ catalytic activity are included in a total reaction slurry of the ingredients are preferred. For example compounds of cerium, and especially those wherein the cerium is in soluble form (e.g., cerium nitrate, cerium acetate, etc.) and compounds of vanadium, and here again those wherein the vanadium is in soluble form (e.g., ammonium meta-vanadate, etc.) are especially preferred. These metallic compounds will generally be used in proportions such that their metal atom components will comprise less than about 10 weight percent of the final product (e.g., FCC microspheroidal particle, fixed bed pellets, etc.).

As a more specific example of an impregnation technique, vanadium pentoxide, $V_2O_5$, in oxalic acid could be soaked into applicant's resulting bastnaesite/alkaline-earth metal compounds. The same soaking procedure might also be used with other such $SO_x$ catalytic materials such as cerium nitrate, cerium acetate, etc. The resulting vanadium/cerium-impregnated bastnaesite/alkaline-earth metal particles are then dried, preferably at about 250° F. for about 60 minutes to about 240 minutes, and subsequently recalcined for about 180 minutes at about 1350° F. Such a second calcination causes the volatile components of such compounds to be driven off (e.g., an oxalate component of vanadium pentoxide will break down to $CO_2$ and steam, which are driven off as gases, leaving the vanadium in the form of catalytically active $VO_2^+$ ions). Bastnaesite/alkaline-earth metal/oxidation agent materials made by such impregnation techniques most preferably will comprise from about 0.5 to about 4 percent oxidation agent (e.g., vanadium) by weight, with about 2 percent by weight being a particularly preferred proportion.

Preferred Uses of These Compounds

This patent disclosure contemplates using the herein described compounds as $SO_x$ absorbent/catalysts in petroleum cracking, chemical manufacturing, electrical power production plants, etc., units: (1) in their own right as $SO_x$ additives, (2) in chemically and/or physically bound conjunction (e.g., as by impregnation techniques well known to the art) with other known $SO_x$ catalysts such as vanadium and cerium, and (3) in conjunction with other totally different kinds of catalyst particles and especially those aluminosilicate catalysts commonly used to "crack" crude petroleum. They also can be used in various physical forms such as FCC microspheroidal particles, fixed bed pellets, etc. In accordance with one of the most preferred embodiments of this invention, bastnaesite/alkaline-earth metal compound, microspheroidal particles will be introduced into a petroleum refining FCC unit by blending them into a circulating bulk catalyst at some convenient location in the FCC process. The amount of bastnaesite/alkaline-earth metal compound so added will vary with the individual FCC unit and with the amount of $SO_x$ desired to be removed from a given regenerator flue gas. Generally speaking, the $SO_x$ catalyst component of the FCC unit's bulk catalyst will be less than about 5.0% of the bulk catalyst (and more preferably they will constitute about 1.0–2.0 weight percent of the bulk catalyst).

Expressed in patent claim language, use of applicant's compounds in a FCC context can be described as removing $SO_x$ from a fluid catalytic cracking process wherein hydrocarbon cracking catalyst particles, which are contaminated by sulfur-containing coke, are regenerated by removal of the coke, said process comprising: (1) circulating a minor portion (e.g., less than 5.0% by weight of the bulk catalyst) of a bastnaesite/magnesium oxide/aluminum oxide, $SO_x$ absorbent-catalyst with a major portion (e.g., 95 to 99 weight percent) of a hydrocarbon cracking catalyst and wherein the bastnaesite/magnesium oxide/aluminum oxide, $SO_x$ absorbent-catalyst is further characterized by the fact that a bastnaesite component of the bastnaesite/magnesium oxide/ aluminum oxide, $SO_x$ absorbent-catalyst is chemically reacted with a magnesium oxide/aluminum oxide component of said bastnaesite/magnesium oxide/aluminum oxide, $SO_x$ absorbent catalyst.

Usually, in such FCC operations, the bastnaesite/alkaline-earth metal compound particles are added at a rate such that, of the total amount of catalyst particles and bastnaesite/ alkaline-earth metal particles recirculating through the unit, 1.0 to 3 percent ("a minor amount") of the total catalyst particles will be bastnaesite/alkaline-earth metal compound $SO_x$ additive particles. The average size of the $SO_x$ particles introduced into such FCC units will most preferably be the same as that of the bulk catalyst particles themselves, i.e., about 20 to 80 microns in diameter for petroleum cracking catalysts.

On the other hand, power production plants burning sulfur-containing coal as well as various chemical and petrochemical plants, may prefer to use the herein described compounds in those pellet forms used in so-called "fixed bed" systems wherein a $SO_x$-containing gas is forced through beds of catalyst pellets in order to remove an $SO_x$ component of a gas being forced through the bed.

DESCRIPTION OF PREFERRED EMBODIMENTS

Figure 1:
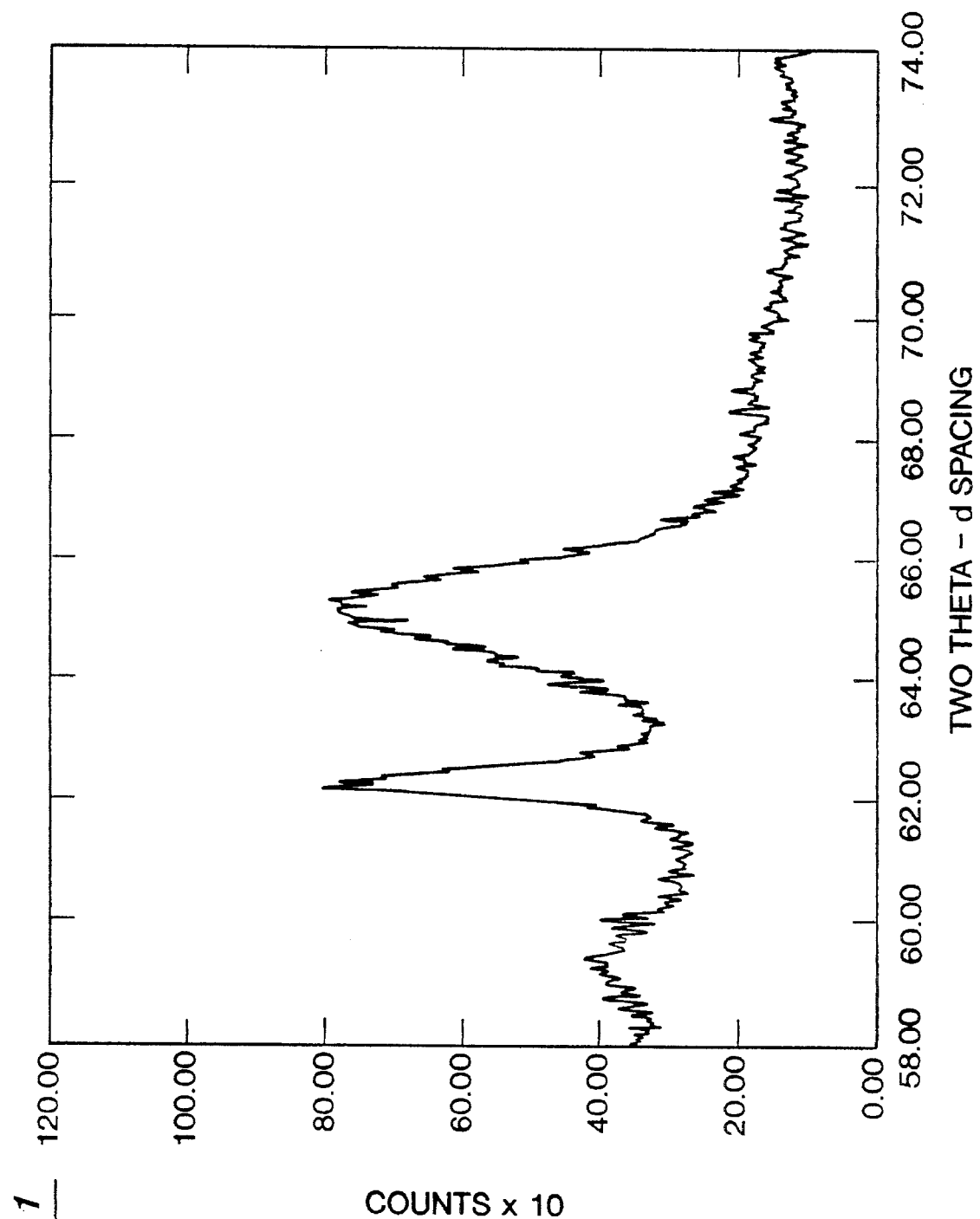
FIG. 1 depicts a XRD pattern for a stoichiometric spinel which is mixed with "free" magnesia.

Experimental Program Re: The Nature and Use of Bastnaesite/Alkaline-Earth Metal Oxide Compounds Applicant's various experimental programs established that: (1) through use of the herein described procedures, a chemical reaction can be made to take place between bastnaesite and alkaline-earth metal ($R^{2+}[A]$) ingredient(s), (2) the compounds resulting from such bastnaesite/alkaline-earth metal reactions are especially characterized by their absorbance and regenerability when used as $SO_x$ additives, (3) the presence of so-called "free" magnesia in certain bastnaesite/magnesia or bastnaesite/spinel-like compounds resulting from the herein described processes is not in any way detrimental to the $SO_x$ absorbent/catalyst/regeneration capabilities of such compounds, (4) composite materials wherein bastnaesite and alkaline-earth metals are merely mixed together, or "glued" together through the use of well-known catalyst binder materials (as opposed to being chemically reacted à la the teachings of this patent disclosure), are far less effective as $SO_x$ absorbent/catalyst materials compared to applicant's bastnaesite/alkaline-earth metal compounds wherein bastnaesite is in fact chemically reacted with an alkaline-earth metal component of the resulting compound, (5) applicant's compounds display very significant comparative advantages over a wide variety of prior art $SO_x$ additives, (6) the herein described bastnaesite/alkaline-earth metal compounds are able to catalyze the oxidation of $SO_2$ to $SO_3$ and otherwise encourage it to be absorbed by other entirely different catalyst species (e.g., by alumino-silicate hydrocarbon cracking catalysts, ceria-impregnated spinels, etc.), (7) the range of acid equivalency conditions that can be employed in reactions involving $R_2^{3+}[B]$ ingredients such as alumina is from about 0.5 to about 10.0 milliequivalents of mono-protonic acid per gram of $R_2^{3+}[B]$ ingredient, (8) the herein described materials are able to perform an $SO_x$ additive function when they are mixed with other catalysts—either in the form of particle mixtures or in the form of composite particles or composite pellets, (9) when bastnaesite is chemically reacted with certain ingredients such as magnesia and alumina, which would otherwise form spinels, the resulting bastnaesite/spinel-like compounds have decidedly different characteristics from either bastnaesite alone or spinel alone (e.g., their respective X-ray diffraction patterns are decidedly changed and their $SO_x$ regeneration properties are very different), (10) if applicant's bastnaesite/spinel-like, $SO_x$ additive compounds contain more than 100 percent excess magnesia they do not loose their $SO_x$ regenerability à la the spinel $SO_x$ absorbents described in the Science and Technology reference, but rather show greater and greater $SO_x$ absorbent abilities beyond 100 percent excess magnesia, up to about 400 percent excess magnesia, (11) excess magnesia is removed from the lattice of a spinel-like component of applicant's bastnaesite/spinel-like compounds under FCC operating conditions, (12) the $SO_x$ absorbent abilities of applicant's bastnaesite/excess magnesia-containing spinel-like compounds can be enhanced by heating (as by steam treating or otherwise heating) the products of the herein described processes before they are placed in use in a FCC unit and (13) the heating conditions encountered in use (e.g., in a FCC unit) will also serve to enhance the $SO_x$ absorbent abilities of the herein described bastnaesite/magnesia/alumina compounds.

Representative TGA Tests

The $SO_x$ absorption rate of various experimental $SO_x$ additives was measured with a modified thermogravimetric analysis unit (TGA unit). The equipment used in these tests consisted of a Polymer Laboratories STA 1500® thermogravimetric unit coupled with a microcomputer. Generally speaking, such tests involved loading approximately 10 milligrams of a $SO_x$ additive into a porcelain sample boat and heating it under various conditions. $SO_x$ pick-up results were normalized to the weight at the point where $SO_x$ gas commenced to be introduced. A typical composition for the $SO_2$ gas mixture employed as the "contaminant" was 1000 ppm $SO_2$, 5% $CO_2$, 1% $O_2$, with the balance being nitrogen.

Two separate modes of operation were used in these TGA experiments. In one mode, the initial rate of absorption was measured. In the second mode, the absorbent was run in a cyclic manner to test a material's ability to be regenerated. These TGA tests, together with a series of other experiments carried out in a large-scale FCC pilot plant, established the usefulness of applicant's bastnaesite/alkaline-earth metal compounds in removing $SO_x$ from the flue gas of a FCC regenerator and the ability of these materials to be repeatedly "regenerated." When considered in conjunction with various X-ray diffraction measurements, these TGA and pilot plant tests also served to corroborate that a chemical reaction has occurred between the bastnaesite and the alkaline-earth metal as a result of applicant's processes and that, in the absence of the occurrence of such bastnaesite/alkaline-earth metal chemical reactions, the otherwise very same ingredients would "age" or deactivate very rapidly with respect to their $SO_x$ absorbent/catalyst properties. These tests also established that, after one pass through a FCC unit, the very same unreacted ingredients are not easily regenerated with respect to their ability to repeatedly pick up $SO_x$.

Applicant also established that the most important reactions taking place in the practice of this invention are:

(1) $SO_2 + \frac{1}{2}O_2 \rightarrow SO_3$ having rate R-1

(2) $SO_3 + MgO \rightarrow MgSO_4$ having rate R-2

(3) $MgSO_4 + 4H_2 \rightarrow MgO + H_2S + 3H_2O$ having rate R-3

In considering these reactions, note first that applicant was highly concerned with determining the relative reaction rates of these reactions. In practice, oxidation reactions (1) and (2) occur, at rates R-1 and R-2, respectively, in a FCC unit's regenerator, while reduction reaction (3) occurs, at reaction rate R-3, in the FCC reactor itself. Reaction (1) is concerned with the conversion of sulfur dioxide to sulfur trioxide. Those skilled in this art will appreciate that sulfur dioxide ($SO_2$) must be converted to sulfur trioxide ($SO_3$) before the sulfur content of a gas stream can be absorbed and removed from that gas stream. This follows from the fact that $SO_3$ gas can be absorbed while $SO_2$ gas can not. Reaction R-2 is mostly concerned with the absorbance of $SO_3$, once it is formed. Generally speaking, applicant found that the rate of reaction R-1 (the rate of the surface-catalyzed oxidation of $SO_2$ to $SO_3$) is the "controlling" reaction in the above-noted series of reactions. For example, in studying these different reactions, applicant found the R-2 absorption rates are much faster than the R-1 catalysis reaction for the herein described materials (i.e., the absorption rate is much faster than the rate of surface-catalyzed oxidation of $SO_2$ gas to $SO_3$ gas). Applicant also found that the overall "holding capacity" of his $SO_x$ absorbent materials—rather than the rate at which the $SO_3$ gas reacts with that absorbent material—was the more important factor.

Again, the third reaction rate R-3 involves reduction of the alkaline-earth metal sulfate back to its metal oxide form. Again, reaction (3) occurs in the FCC reactor, rather than in the FCC unit's regenerator unit. In other words, these bastnaesite/alkaline-earth metal particles, as they continuously recycle through a FCC unit's riser, stripper, and regenerator, alternately remove $SO_x$ compounds from the regenerator flue gases and subsequently release them in the riser and stripper in the form of $H_2S$. The $H_2S$ gas is then removed with the other gases produced in the riser and stripper and eventually converted into elemental sulfur. Thus, applicant's bastnaesite/alkaline-earth metal particles undergo alternate changes in chemical form that, for the most part, involve oxidation reactions in the regenerator and reduction and/or hydrolysis reactions in either the FCC unit's riser or stripper or both.

As part of this overall experimental program, applicant also provided many of his $SO_x$ additives with separate and distinct $SO_x$ catalyst species (e.g., cerium, vanadium, platinum, etc.) which are known to be capable of providing a high rate of $SO_2$ to $SO_3$ oxidation. For the most part, such $SO_x$ additive materials were impregnated with cerium and/or vanadium ion-containing solution(s). Also note that as long as the $SO_x$ catalysis rate (R-1) was kept relatively high, even less preferred $SO_x$ absorbents made according to this invention were still able to capture very significant amounts of the $SO_3$ (e.g., they captured more $SO_3$ than many commercially available $SO_x$ absorbents). More important, even applicant's less preferred compounds were much more regenerable with respect to their $SO_x$ activity.

FCC Pilot Plant Aging Studies

The FCC pilot plant employed by applicant consisted of a reactor, a stripper, and a regenerator. A bulk cracking catalyst in which a given $SO_x$ catalyst was mixed was continuously circulated between the reactor, stripper, and regenerator sections of the FCC unit. In the reactor the circulating catalyst was contacted with a hydrocarbon feed stock. As a result of the reactions that occur on the surface of the catalyst (the so-called "cracking reactions"), the bulk catalyst became fouled with a deposit of "coke" that included a sulfur contaminant. The coked catalyst then passed to a stripper where it was contacted with steam to remove entrained hydrocarbons. The stripped catalyst was then sent to the regenerator where it was contacted with air to burn off the coke deposit to restore the catalyst activity. It was at this point that sulfur, which constituted a part of the coke deposit, was burned to sulfur dioxide. As part of applicant's experiments, the sulfur dioxide in the flue gas was continuously recorded by a $SO_x$ analyzer.

In a typical experiment conducted by applicant, a FCC pilot plant was first started up with a bulk catalyst that did not contain any additive that would remove $SO_x$. After the unit operation had been stabilized and the $SO_x$ content of the flue gas had been established, the $SO_x$ additive under consideration was injected into the circulating bulk catalyst stream. The normal amount of additive used was 1 percent by weight of the "bulk" or total catalyst in the circulating catalyst inventory. The $SO_x$ content of the flue gas was then monitored for up to 48 hours. If the additive failed to remove $SO_x$ from the flue gas, the experiment was terminated in a few hours. Typically, after an experimental $SO_x$ additive was tested, a standard additive of known performance was tested under the same conditions as the experimental additive. This was done because it was not always practical to use the same hydrocarbon feed stock or catalyst for every experiment.

Some typical pilot plant results obtained by applicant in these experiments are shown in TABLE III below:

TABLE III

| SAMPLE DESCRIPTION | $SO_x$ REMOVED, % wt |
|---|---|
| Ceria and Spinel | 90 |
| Chemically Reacted Bastnaesite/Spinel-like Compound (see Ex. 6 and FIG. 2) | 92 |
| Ceria and Spinel | 80 |
| Physical Mixture of Bastnaesite and Spinel (see Ex. 7 and FIG. 4) | 10 |

Applicant repeatedly found that the $SO_x$ absorbent performance of the compounds produced by the herein described processes was at least comparable to, and usually superior to, far more expensive $SO_x$ absorbent/catalyst materials such as ceria- and/or vanadia-impregnated spinels. Applicant's chemically reacted bastnaesite/alkaline-earth metal compounds also were much more effective $SO_x$ additives than (i) physical mixtures of bastnaesite and (ii) a wide variety of metal oxide materials, (iii) magnesia, (iv) alumina, (v) stoichiometric spinel, and (vi) various different kinds of magnesia-rich spinel.

Figure 6:
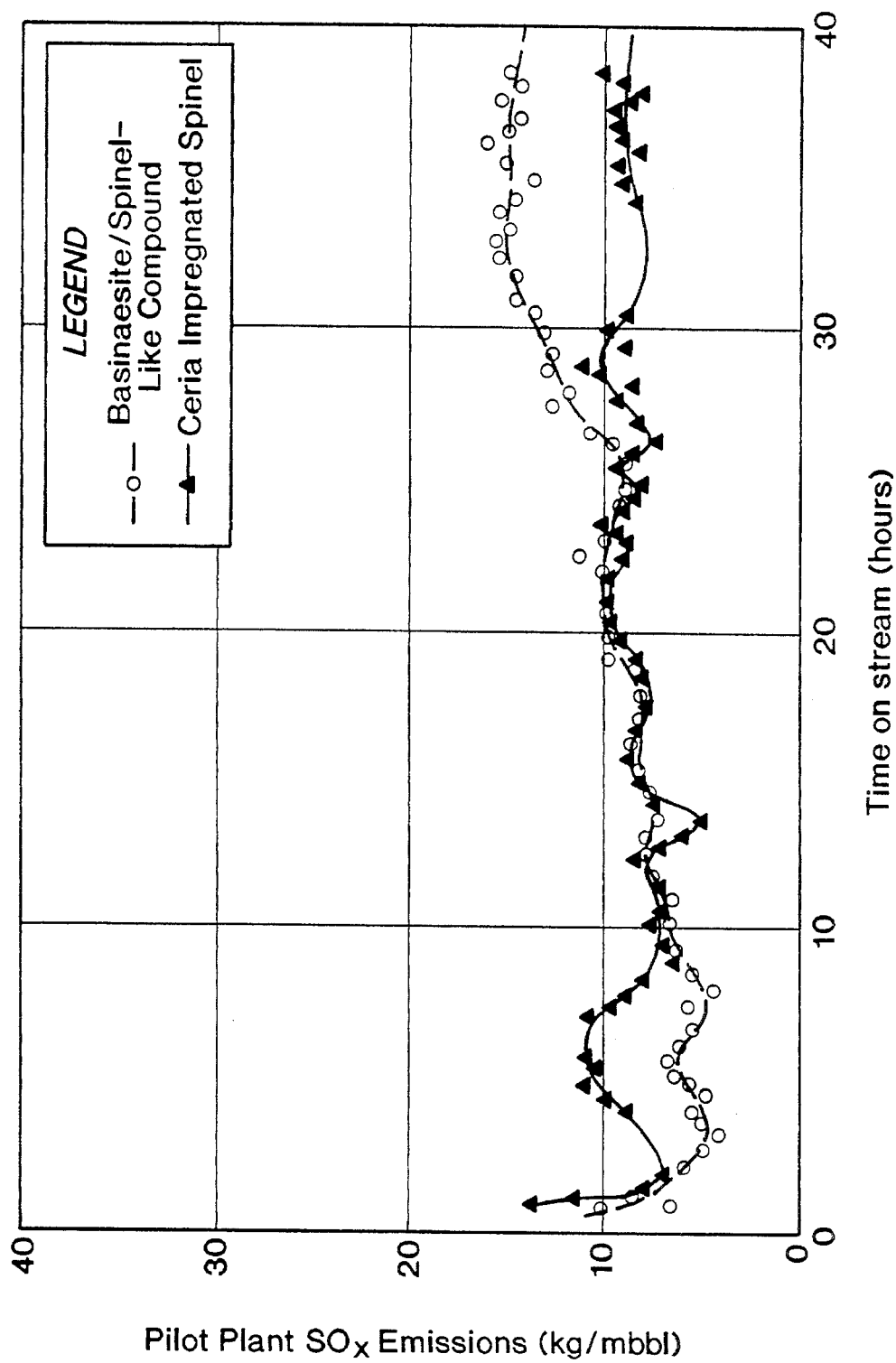
FIG. 6 gives data for extended cyclic use ($SO_x$ contamination/regeneration) in a FCC unit of a spinel impregnated with ceria, versus a bastnaesite/spinel-like compound made according to the teachings as this patent disclosure.

By way of further example of applicant's pilot plant studies, FIG. 6 depicts the comparative $SO_x$ absorption abilities of a ceria-impregnated spinel versus a chemically reacted, bastnaesite/spinel-like compound that is used in the same way as the ceria-impregnated spinel material. Both materials were repeatedly used and regenerated over a 40-hour period. Such tests were based on $SO_x$ "emissions," which are expressed as kilograms of $SO_x$ emitted per thousand barrels of fresh feed stock material processed in the FCC test unit. Note in passing that the expression "Emissions kg/mbbl" given in FIG. 6 is the designation for a rather arbitrary, but widely used, industry standard meaning that, for comparative purposes, one would expect to get 100 kilograms of $SO_x$ per thousand barrels of feedstock if no $SO_x$ catalyst whatsoever were employed in the bulk FCC catalyst inventory. In any event, the depiction in FIG. 6 indicates that the curve for one of applicant's chemically reacted bastnaesite/spinel-like compounds (i.e., curve o—o—o) always lies just above the curve for the ceria-impregnated spinel (i.e., curve ▲—▲—▲) over the entire 40-hour time span of the test. This implies that this $SO_x$ absorbent performed almost as well as the far more expensive ceria-impregnated spinel.

Another round of applicant's FCC experiments showed that bastnaesite, by itself, shows little sustained ability to absorb $SO_3$ after very few passes through the FCC unit. For instance, the material produced by the procedures of Example 7 of this patent disclosure gave poor long-term results. In effect, these materials acted as if they were physical mixtures of bastnaesite and magnesia. It also should be noted in passing that the data for the processes described in U.S. Pat. No. 4,311,581 ("the '581 patent") tends to corroborate applicant's own observations regarding bastnaesite's inability to be regenerated once it has formed a metal sulfate product with the $SO_3$ gas (e.g., the data given in the '581 patent shows that 15 percent by weight bastnaesite had to be in a bulk catalyst to achieve an 80 percent reduction in $SO_x$).

By way of direct comparison on this point, the additive described in Example 6 of this patent disclosure provided an "average" of about 90 percent weight reduction in $SO_x$ in a bulk catalyst/$SO_x$ catalyst system wherein the $SO_x$ catalyst comprised only 1 percent by weight of the bulk catalyst. Indeed, the $SO_x$ additive whose performance is depicted in the o—o—o curve of FIG. 6 was comprised of only 30 percent bastnaesite (i.e., the bastnaesite/spinel-like compound was comprised of about 30 percent bastnaesite and about 70 percent of the spinel-like component of the overall compound). Consequently, the concentration of bastnaesite in the bulk catalyst inventory was only 0.3 percent by weight. This is a very significant difference over the performance of bastnaesite alone. Thus, taken together, these test results show that while bastnaesite may have an excellent initial ability to remove $SO_x$, it ages very rapidly and it is only by using large proportions (e.g., 15 percent) that bastnaesite can be made to remove $SO_x$ at acceptable rates for even relatively short periods.

XRD Tests

The techniques of X-ray diffraction (XRD) are of course well known. Hence, for the purposes of this patent disclosure, it need only be briefly stated that the orderly, serried ranks of atoms in a crystalline lattice can be viewed at various angles in which files of atoms line up with a clear "avenue of sight" along certain cutting planes. That is, all crystals, in three dimensions, can be "viewed" from a standpoint of three different axes, and identification of such avenues can be made by counting atoms spaced from an arbitrary point of origin along each of three orthogonal axes. Such a plane can be identified by three designators, e.g., A, B, C, or X, Y, Z, etc., having certain values 2,5,7 or 4,4,0 (which, incidentally would be abbreviated "440"), etc. In conducting XRD tests, a subject crystal is rotated until a plane is observed which permits X-rays of an appropriate wavelength to be diffracted by the lattice and, consequently, exhibit a detectable "peak" (or peaks) for such X-rays. The critical measurement for the XRD peak plane is the angle of rotation of the crystal. In practice, because of certain mathematical relationships between these variables, such a peak is observed as an intensity ordinate plotted against an abscissa of 2-θ, the angle of rotation. Thus, such XRD patterns can be thought of as exhibiting certain significant peaks that correspond to the angle of rotation, which is usually designated by the use of expressions such as interplanar spacing d(A) or 2-θ-d spacing or 2-θ (Θ) or simply a "2-θ value." Thus, when a chemical reaction produces a product having a crystalline structure, XRD pattern differences are one of the surest methods known to detect whether a chemical reaction has in fact occurred between molecules under consideration. It is also one of the surest methods to distinguish between the chemical structures of various crystalline materials.

Consequently, many XRD measurements of this type were made by applicant to test whether applicant's bastnaesite ingredient had reacted with a given alkaline-earth metal. They also were used to try to establish the molecular structure of the end product compounds made by the processes of this patent disclosure. That is, various materials prepared by the processes of this patent disclosure were studied by XRD, both in their own right and by comparison with other $SO_x$ absorbent/catalyst materials having comparable ingredients, but different crystalline structures.

XRD Comparisons of Effects of Ceria on Bastnaesite/Spinel-Like Compounds

Figure 11:
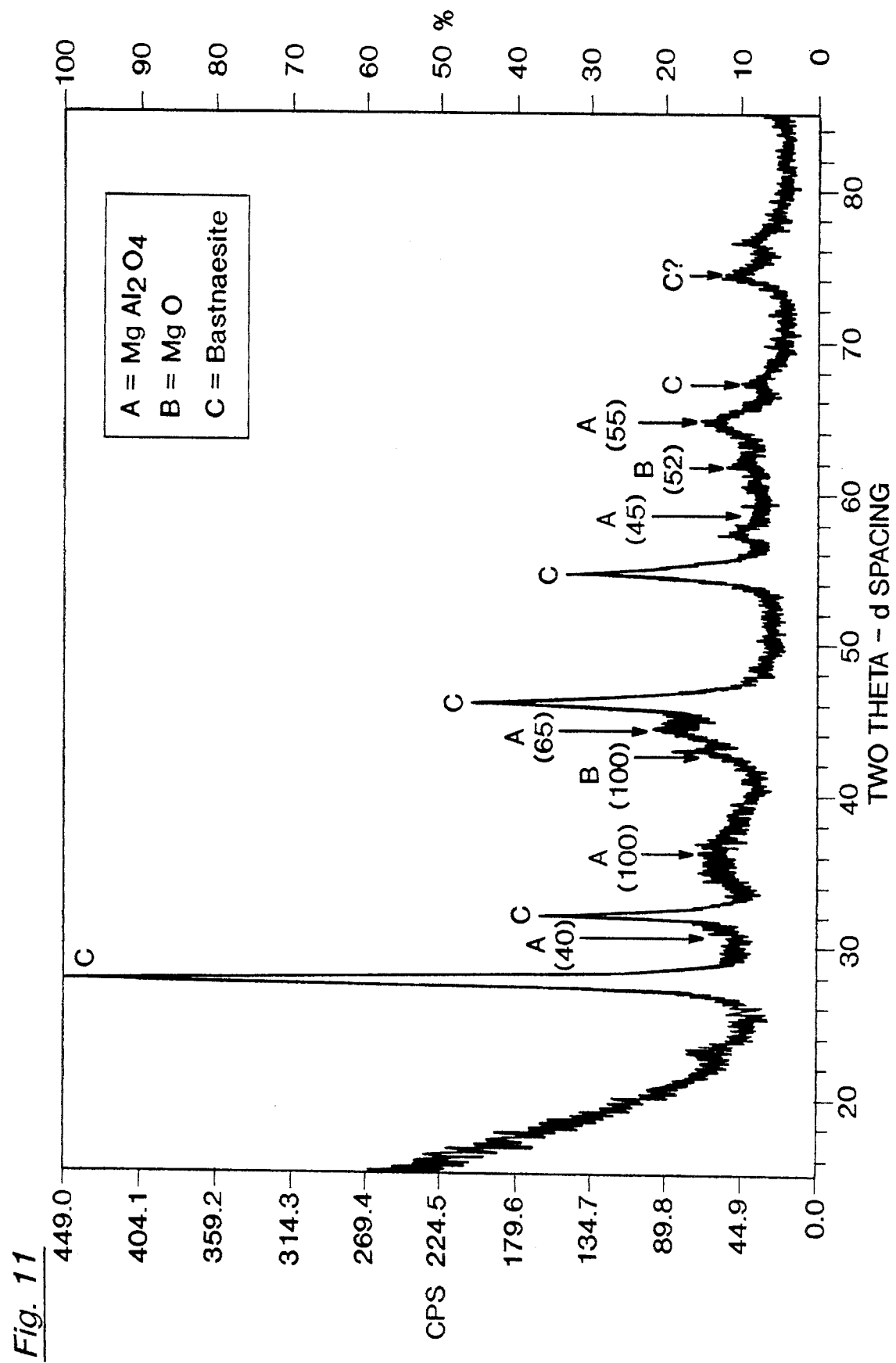
FIG. 11 is the XRD pattern for a bastnaesite/spinel-like compound having a $MgO/Al_2O_3$ ratio of 2.2.
Figure 12:
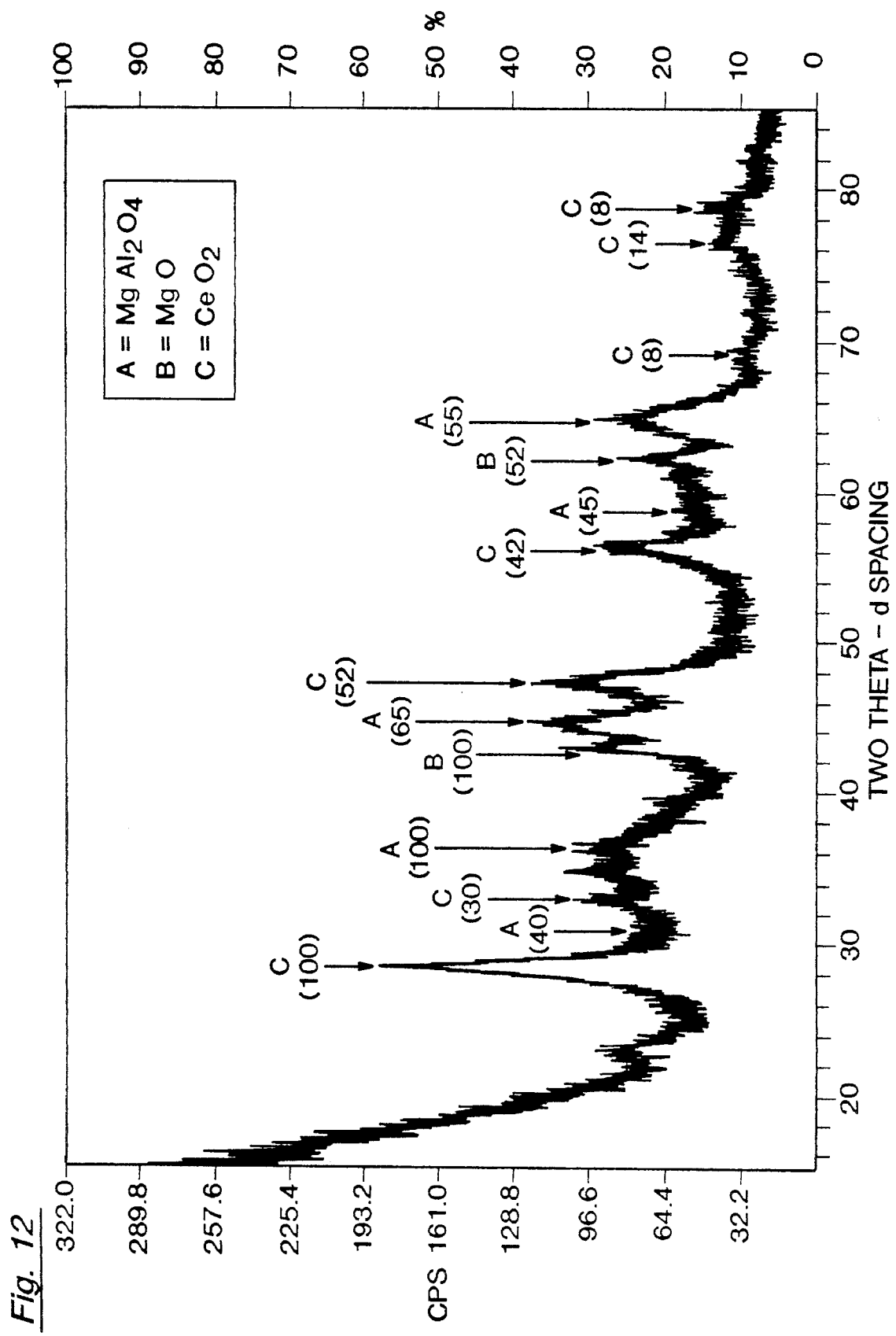
FIG. 12 gives the XRD pattern for a magnesia-rich spinel whose $MgO/Al_2O_3$ ratio is 2.2 and which is impregnated with ceria.

The XRD pattern labeled "2.2 MgO/$Al_2O_3$" in FIG. 12 is for a spinel that was impregnated with a ceria oxidation catalyst. The key ceria peaks are labeled as such thereon. By way of comparison, the XRD pattern labeled "2.2 MgO/$Al_2O_3$" in FIG. 11 had bastnaesite substituted for the ceria, and the resulting bastnaesite peaks are labeled "Bast" for bastnaesite. The ceria peak at 28.4 degrees is the key cerium dioxide peak. The corresponding peak in the bastnaesite-containing sample is 27.7 degrees. This peak is actually for cerium oxyfluoride. This is an important comparative distinction because, among other things, in the '177 patent, fluoride is leached from bastnaesite to convert it to cerium dioxide. Again, this was done in the '177 patent to improve the aging characteristics of the rare-earth components resulting from defluorination of bastnaesite.

Because the fluoride is actually removed, we would expect the bastnaesite peak at 27.7 to shift to 28.4. However, in applicant's samples there was in fact no indication that applicant's "chemical reaction" removed fluoride from the bastnaesite structure. This XRD data is perhaps the very best evidence that bastnaesite's cerium oxyfluoride component has not been altered by applicant's processes à la the teachings of the '177 and '204 patents. Indeed, this XRD data proves conclusively that fluoride remains in applicant's bastnaesite structure as cerium oxyfluoride and, consequently, that applicant's bastnaesite components are not comparable to the "rare earth component or mixture of rare earth components" taught by the '177 and '204 patents.

Magnesia Phase

Referring again to the XRD pattern shown in FIG. 12 for a 2.2 $MgO/Al_2O_3$ ratio spinel made with ceria, one also should note that magnesia peaks at about 44 and 62 degrees. These are the characteristic peaks for the periclase phase of magnesia. The adjacent peaks at 65° and 45° indicate $MgAl_2O_4$. The magnesia and the $MgAl_2O_4$ have comparable intensities. Referring to FIG. 11, it next should be noted that when bastnaesite is added to a magnesia/alumina mixture under conditions wherein a chemical reaction takes place, the periclase phase all but disappears. Indeed, there is a general lowering of all of the peaks because the bastnaesite strongly absorbs the X-rays; nonetheless, there can be little doubt that the relative intensities of the magnesia peak relative to the $MgAl_2O_4$ peak have changed dramatically. It was this unusual and unexpected behavior of bastnaesite's XRD pattern that first drew applicant's attention to the potential for creating this entire class of materials.

$MgAl_2O_4$

The chemical structure of applicant's bastnaesite/ $MgAl_2O_4$ compound is considerably at odds with that of $MgAl_2O_4$ spinel as defined by the JCPDS-21-1152 XRD pattern. This is particularly evident by the intensity of the peak at 36 degrees in FIG. 11. This peak "should" (i.e., relative to spinel defined by JCPD-21-1152) have a relative intensity of about 100 relative to the other $MgAl_2O_4$ peaks, but it does not. In addition, the peaks at 19, 32 and at 59 degrees for the reference $MgAl_2O_4$ are virtually gone. Thus, XRD evidence such as this compelled applicant to use the phrase "spinel like" in describing these materials since they no longer are "true" spinels (involving only magnesia and alumina and having XRD patterns like that shown in JCPDS-21-1152) as evidenced by their significantly different XRD patterns.

Figure 4:
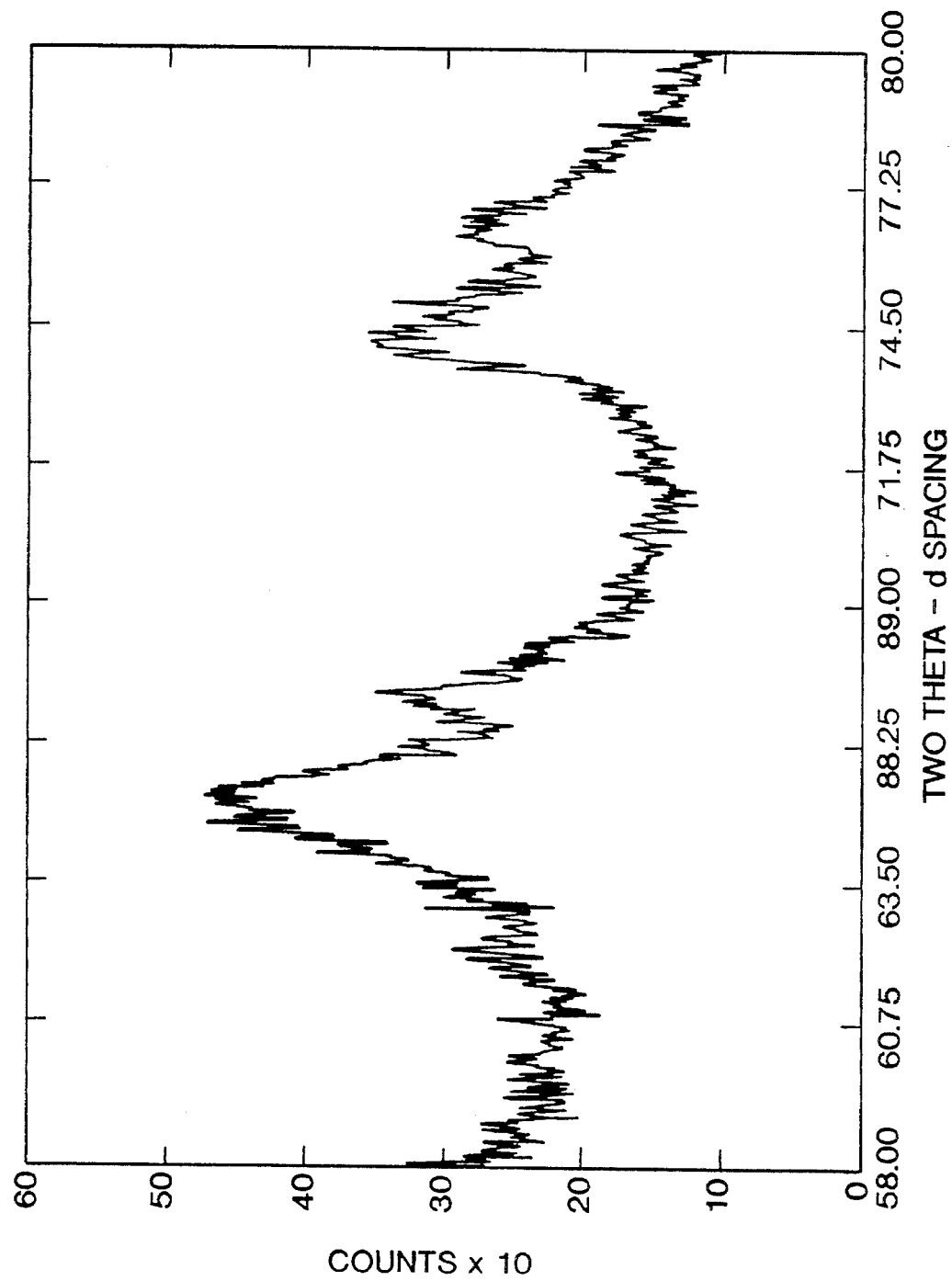
FIG. 4 depicts the XRD pattern for a compound made with the same ingredients and proportions as the compound whose XRD is depicted in FIG. 2 when the bastnaesite fails to chemically react with the magnesia because not enough mono-protonic acid was used in making the alumina sol.

As another example, which views this phenomenon from a different aspect, the XRD pattern in FIG. 4 for the material produced by Example 7 strongly indicated that a chemical interaction between the spinel and bastnaesite did not occur. This non-occurrence of a chemical reaction was corroborated by to convert $SO_2$ to $SO_3$; as expected, the overall $SO_x$ the fact that the bastnaesite component of the material aged very rapidly and soon lost its ability removal efficiency for this material proved to be quite poor. Similar XRD evidence for many other bastnaesite/$SO_x$ additive mixtures corroborated that the non-occurrence of a chemical reaction between bastnaesite and several alkaline-earth metal compounds manifested itself in poor $SO_x$ absorption properties of the non-reacted materials.

For further insight into the nature of applicant's chemical reactions, applicant's XRD data clearly established that in certain cases involving excess proportions of magnesia and alumina, one-half of the magnesia originally in various bastnaesite/magnesia/alumina ingredient mixtures could not be accounted for by any known XRD peak; it could only be concluded that the "missing" magnesia must be associated with the bastnaesite. Thus, the basis for the overall conclusions drawn from experimental observations is that, in the absence of a reaction with bastnaesite, magnesia normally forms solid solutions with alumina. For example, if one starts with a mixture of excess magnesia and alumina and calcines it at some elevated temperature, a solid solution of magnesia in alumina will form. This material has a characteristic XRD pattern, and one of the key peaks is at a 2-θ value of 64.4° (see the XRD pattern depicted in FIG. 3). This material also might be referred to as a magnesia-rich spinel with 100 percent weight excess magnesia. If, on the other hand, only half of the magnesia formed a solid solution with the alumina, then another peak would appear at about 62.4°. This is a characteristic peak for magnesia or periclase (see FIG. 1).

Along these same avenues, magnesia in solid solution with alumina having the chemical formula $MgAl_2O_4$ is often referred to as "stoichiometric spinel" or simply "spinel." It has a 2-θ value of 65.2. However, if bastnaesite is included in the magnesia/alumina mixture under the acid equivalence process parameters of this patent disclosure, a most unusual result is obtained. Starting with a $MgO/Al_2O_3$ ratio of 2.0, it was noted that the 2-θ value was 65.2°, which indicates a stoichiometric spinel ($MgAl_2O_4$), but the periclase peak was completely absent (see FIG. 2). Here again, the presumption is that the magnesia has reacted with the bastnaesite. Moreover, the bastnaesite-containing compound takes on an entirely "unexpected" quality relative to the teachings of the prior art—it becomes a highly regenerable $SO_x$ additive.

This effect is unique from another aspect. With some prior art spinel $SO_x$ absorbents, particularly those made by co-precipitation methods, that is, by reacting magnesium nitrate with sodium aluminate to form spinel, it is well known that by raising the starting $MgO/Al_2O_3$ ratio above 2.0, magnesia will be exsolved from the spinel's crystalline structure. That is, one half of the magnesia formed a periclase phase and the other half remained in solid solution with the alumina to form a stoichiometric spinel. Moreover, unlike applicant's bastnaesite/magnesia/alumina compounds, various prior art spinel materials suffered drastic losses in their ability to absorb $SO_x$. In such cases, the $SO_x$ absorption abilities of these prior art spinel materials are directly proportional to the magnesia content of such materials. Moreover, these prior art spinels have a maximum absorption (occurring when the spinel contains 100 percent excess magnesia) that cannot be exceeded. The FCC Science and Technology reference clearly demonstrates this limitation at point B of FIG. 12 of that reference. By way of very dramatic contrast to this limitation, the bastnaesite/magnesia/alumina absorbents of this patent disclosure have no comparable limitation with respect to the amount of "excess" magnesia that can be tolerated by applicant's $SO_x$ additives. Indeed, materials containing up to about 300 percent (and even 400 percent) excess magnesia continued to perform with respect to their $SO_x$-absorbing ability. Even higher levels may be used, but applicant also found that use of magnesium levels above 300 percent "excess" magnesia started to produce FCC particles that began to become "too soft" and hence less attrition resistant.

With respect to the special case of applicant's invention wherein a magnesia component is used in the presence of alumina, applicant's overall experimental program also established that if the starting $MgO/Al_2O_3$ ratio for the ingredients is known, and the 2-θ value for that material is known, then applicant could calculate the amount of "free magnesia" in the spinel-like component of the final bastnaesite/spinel-like compound product. For example, applicant could relate the following cases:

TABLE IV

| Starting MgO/Al$_2$O$_3$ | 2-θ | MgO/Al$_2$O$_3$ XRD | Free MgO % wt |
|---|---|---|---|
| 1.0 | 65.2° | 1.0 | 18.7 |
| 1.0 | 64.5° | 2.0 | 0 |

Thus, if stoichiometric spinel is created, a MgO/Al$_2$O$_3$ ratio of 1.0 in that spinel is noted. The resulting material had a very prominent free magnesia peak in its XRD pattern (see FIG. 1). On the basis of knowledge of the starting MgO/Al$_2$O$_3$ ratio, the free magnesia could be calculated to be 18.7 percent by weight. In the second case in Table IV, all of the magnesia is in the spinel's crystalline lattice; hence, there is no "free" magnesia. In other words, this was a "magnesia-rich" spinel (see FIG. 3). In any event, when applicant mixed bastnaesite with each of these materials, he obtained similar peaks for the spinel and free magnesia. For example, a typical material of this type gave the following XRD data:

| Starting MgO/Al$_2$O$_3$ | 2-θ | MgO/Al$_2$O$_3$ XRD | Free MgO % wt |
|---|---|---|---|
| 1.0 | 65.2° | 1.0 | 0 |

Figure 2:
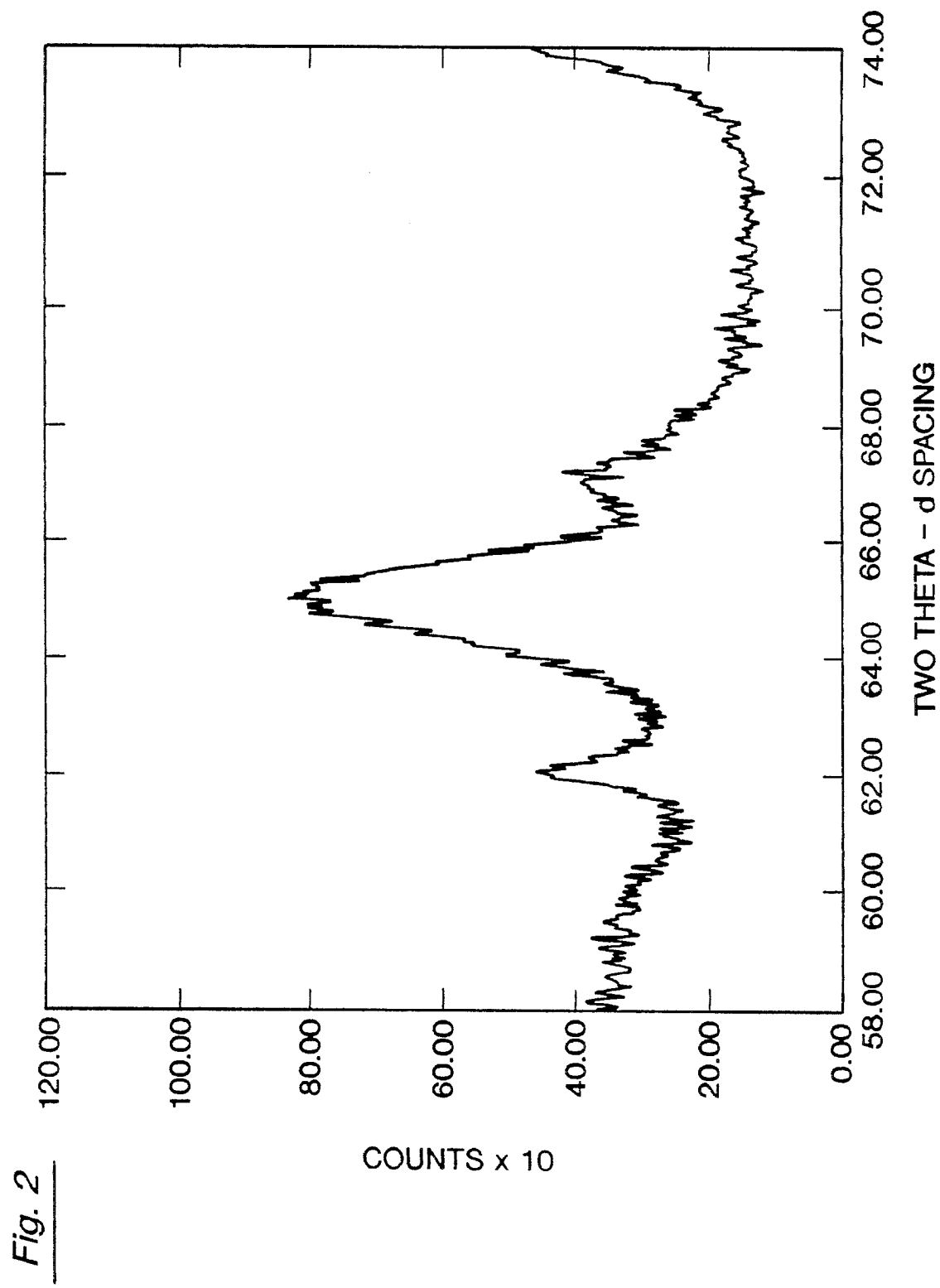
FIG. 2 depicts a XRD pattern for a compound made with the same ingredients and proportions used to make the stoichiometric spinel and free magnesia whose XRD pattern is depicted in FIG. 1 when, however, these same ingredients and proportions are chemically reacted with bastnaesite according to the teachings of this patent disclosure.

Thus, with a 2-θ value of 65.2°, applicant anticipated a large free magnesia peak; however, the peak was in fact essentially zero (see FIG. 2). This finding also constitutes very strong evidence that a new class of compounds (i.e., chemically reacted bastnaesite and spinel-like materials) have been produced by the herein described processes. This data is further evidence of the fact that bastnaesite and spinel have chemically reacted with each other in the herein described processes—as opposed to being merely physically mixed with one another.

Further Discussion of the Figures

FIG. 1 shows the XRD pattern for a spinel which, by design, was not a particularly "good" spinel according to the teachings of the prior art in that it had a large amount of "free magnesia" along with its stoichiometric spinel component. This XRD pattern is therefore particularly characterized by the presence of two distinct peaks. One peak has a two theta reading of 62.5° which is evidence of the presence of magnesia while the other has a two theta reading of 65.2 which suggests the presence of stoichiometric spinel. Note also that the two peaks have about the same intensities (i.e., they have about the same ordinate values).

FIG. 2 depicts a XRD pattern for a spinel which has essentially the same two theta position of 65.2 as the spinel peak of FIG. 1. This second figure was generated by performing a XRD study on a starting composition of magnesia and alumina having a MgO/Al$_2$O$_3$ ratio of 2.0 (the same starting composition as in FIG. 1). However the material differed from that of the material whose XRD pattern is depicted in FIG. 1 in that the otherwise same starting materials were chemically reacted with bastnaesite according to the teachings of this patent disclosure. First, note that the difference in the intensities of the magnesia peaks of FIGS. 1 and 2 is very significant. Moreover, the ratio of the intensity of the spinel peak to the intensity of the magnesia peak in FIG. 2 is very pronounced. The free magnesia intensity is demonstrably lower (note the intensity of the peak at 62.5°); note also that the position of the 65.2° peak has not shifted. Taken together these facts show that a chemical reaction between the bastnaesite and the free magnesia has taken place. Moreover, the significance of the fact that the position of the spinel peak has not shifted is that it very strongly implies that the "free" magnesia evidenced by the 62.5 peak of FIG. 1 has not simply entered into the lattice of the spinel, but rather has chemically reacted with the bastnaesite. That is to say that if the free magnesia had merely gone into the spinel lattice to form a solid solution, the 2-θ value would have shifted from 65.2 to about 64.4. In point of fact this did not occur.

Figure 3:
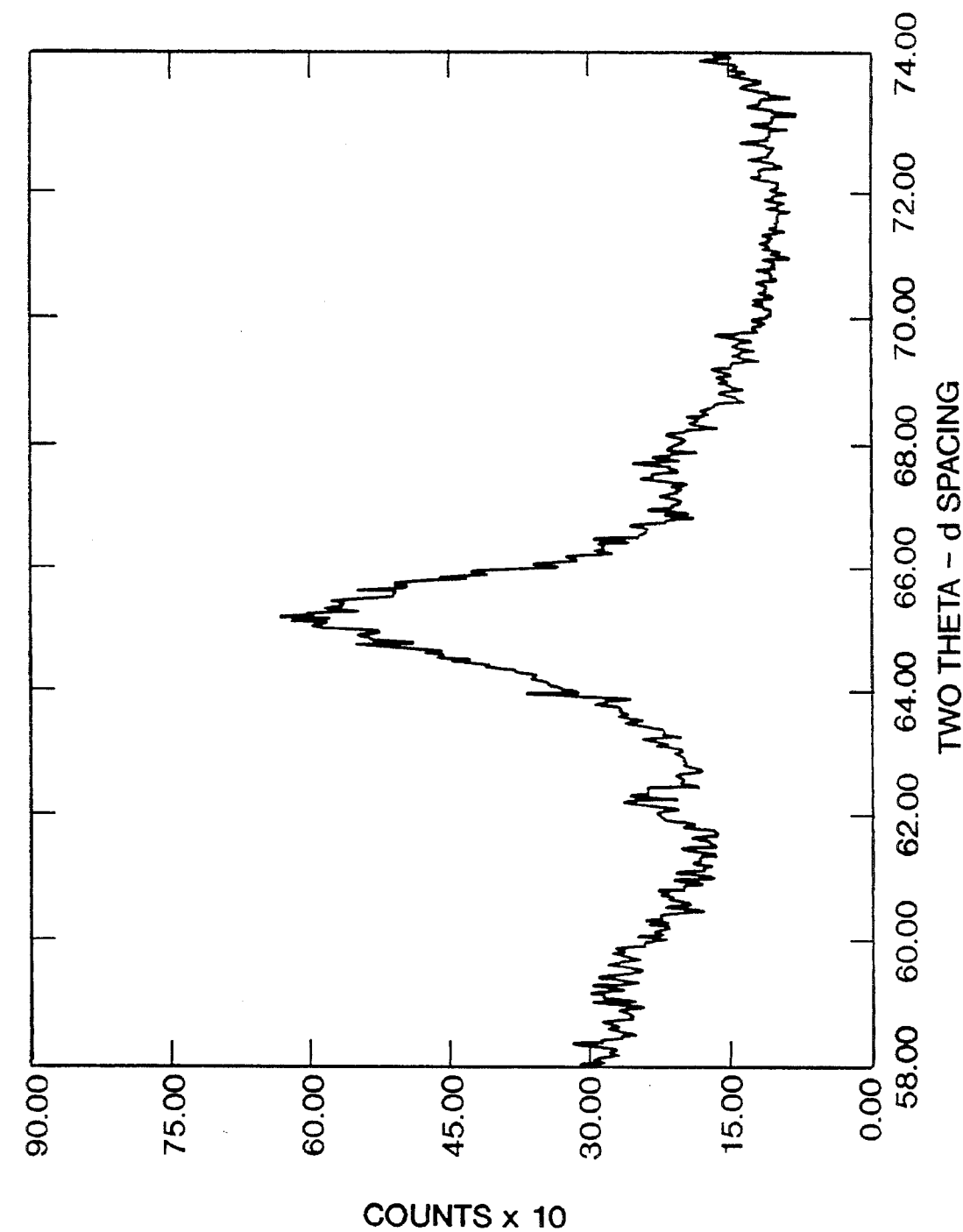
FIG. 3 depicts an XRD pattern for a compound made with the same ingredients and proportions as the spinel whose XRD is depicted in FIG. 1 when virtually all "excess" magnesia is in solid solution with the stoichiometric spinel rather than residing in the material as "free" magnesia.

FIG. 3 depicts a spinel made with a starting composition which had a MgO/Al$_2$O$_3$ ratio of 2.0, but which did not have bastnaesite. Here the 2-θ value is 64.6. There is a rather negligible free magnesia peak at 62.5. Taken together, this data implies that all of the magnesia is in solid solution with the spinel.

FIG. 4 depicts the XRD pattern for a compound that was made with the same ingredients, including bastnaesite, as the material depicted in FIG. 2. However too small an amount of acid (less than 0.5 milliequivalents) was used in preparing the alumina sol component. The 2-θ value for the resulting spinel was 64.7, thereby indicating that most of the magnesia was in solid solution with the stoichiometric spinel rather than reacted with the bastnaesite. Next, it should be emphasized that this "acid-deficient" preparatory procedure produced a compound that showed very poor SO$_x$ pick-up ability in subsequent FCC pilot plant tests.

Thus, taken as a whole, the above-noted data shows that unreacted bastnaesite can be transformed from an essentially non-regenerable SO$_x$ additive into a highly regenerable material when it is in fact chemically reacted with an alkaline-earth metal such as magnesia.

Figure 5:
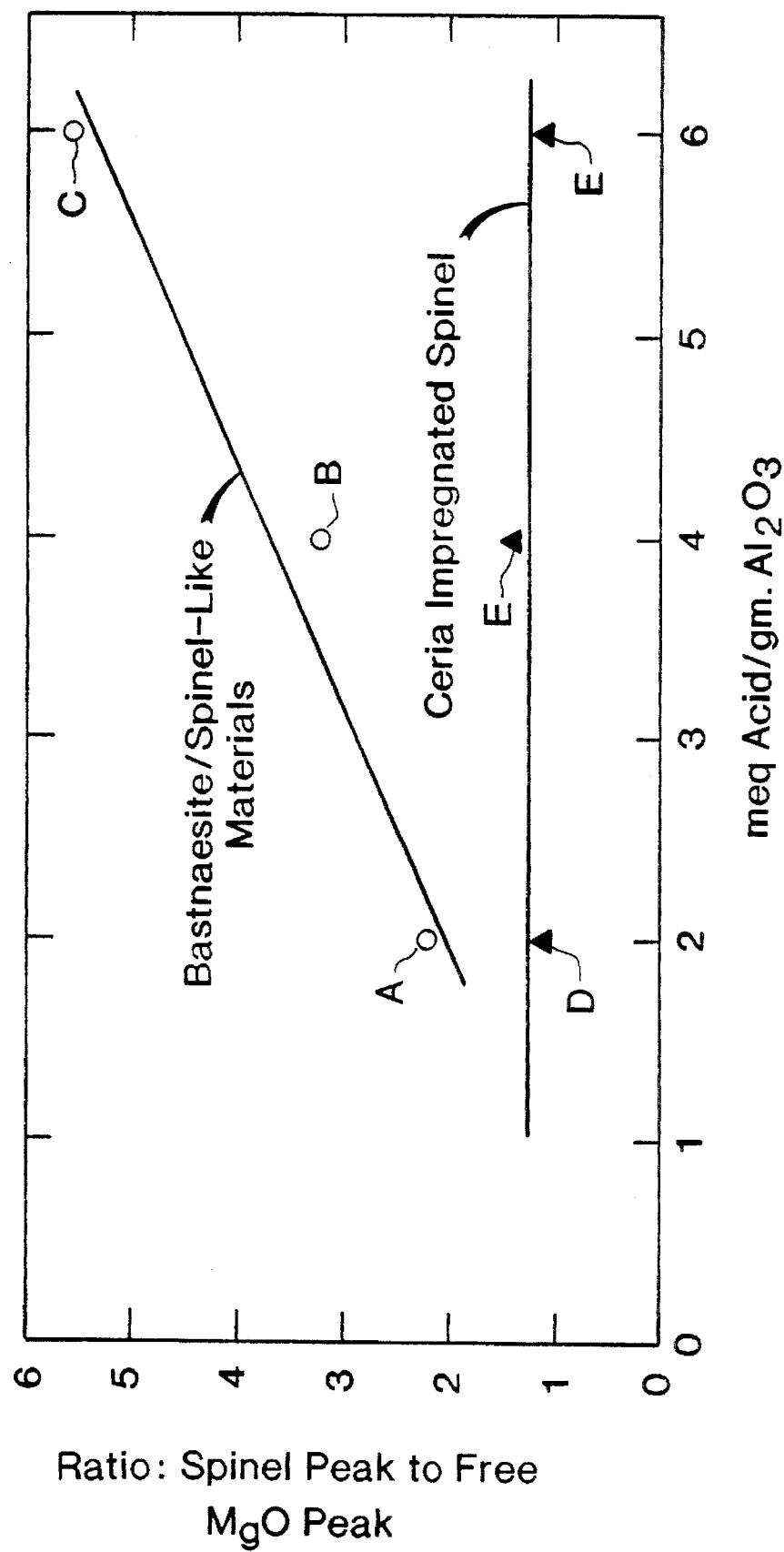
FIG. 5 is a plot of XRD intensity ratios for two distinct preparations (a ceria impregnated spinel and a bastnaesite/spinel-like compound) made with alumina sol ingredients prepared with differing amounts of milliequivalents of mono-protonic acid/gm of alumina.

FIG. 5 plots the effects of the number of milliequivalents of mono-protonic acid on the alumina sols of this patent disclosure in the most important part (1.0 to 6.0 milliequivalents) of the overall 0.5 to 10.0 milliequivalent range. The milliequivalent parameter is expressed as the abscissa in the plot. The ordinate is the ratio of the spinel peak to the free magnesia peak. For example, in FIG. 5 this ratio is about 2.0 for a bastnaesite/spinel-like material A and 5.5 for a bastnaesite/spinel-like material C. The second plot in FIG. 5 shows that in the case of a ceria-impregnated spinel materials D, E, F there is no effect produced by changing the way the alumina is prepared relative to the amount of free magnesia in the SO$_x$ absorbent. This finding also is in agreement with previous work by applicant and others that showed that ceria does not interact with either a spinel or any of a spinel's constituent ingredients.

In the case of applicant's chemical reactions, however, just the opposite is true. As the milliequivalents of acid used to prepare applicant's alumina sols are raised, the amount of "free" magnesia goes down and, consequently, the ratio of the spinel-like components to free magnesia components of applicant's overall compositions goes up. This too is evidence that the bastnaesite is reacting with the magnesia under the conditions of applicant's processes. Applicant also generally found that it is highly preferred to have the milliequivalents of acid used in preparing an alumina sol above about one milliequivalent and most preferably in amounts providing about 3.0 milliequivalents to about 5.0 milliequivalents of such acid(s). The data in FIG. 5 also serves to corroborate other broader (0.5 to 10.0 milliequivalents) parameters established by applicant for the mono-protonic acid requirement of the herein described processes.

FIG. 6 depicts extended FCC cyclic use data for a bastnaesite/spinel-like compound (which was also provided with a vanadia $SO_x$ catalyst) prepared according to the teachings of this patent disclosure.

Figure 7:
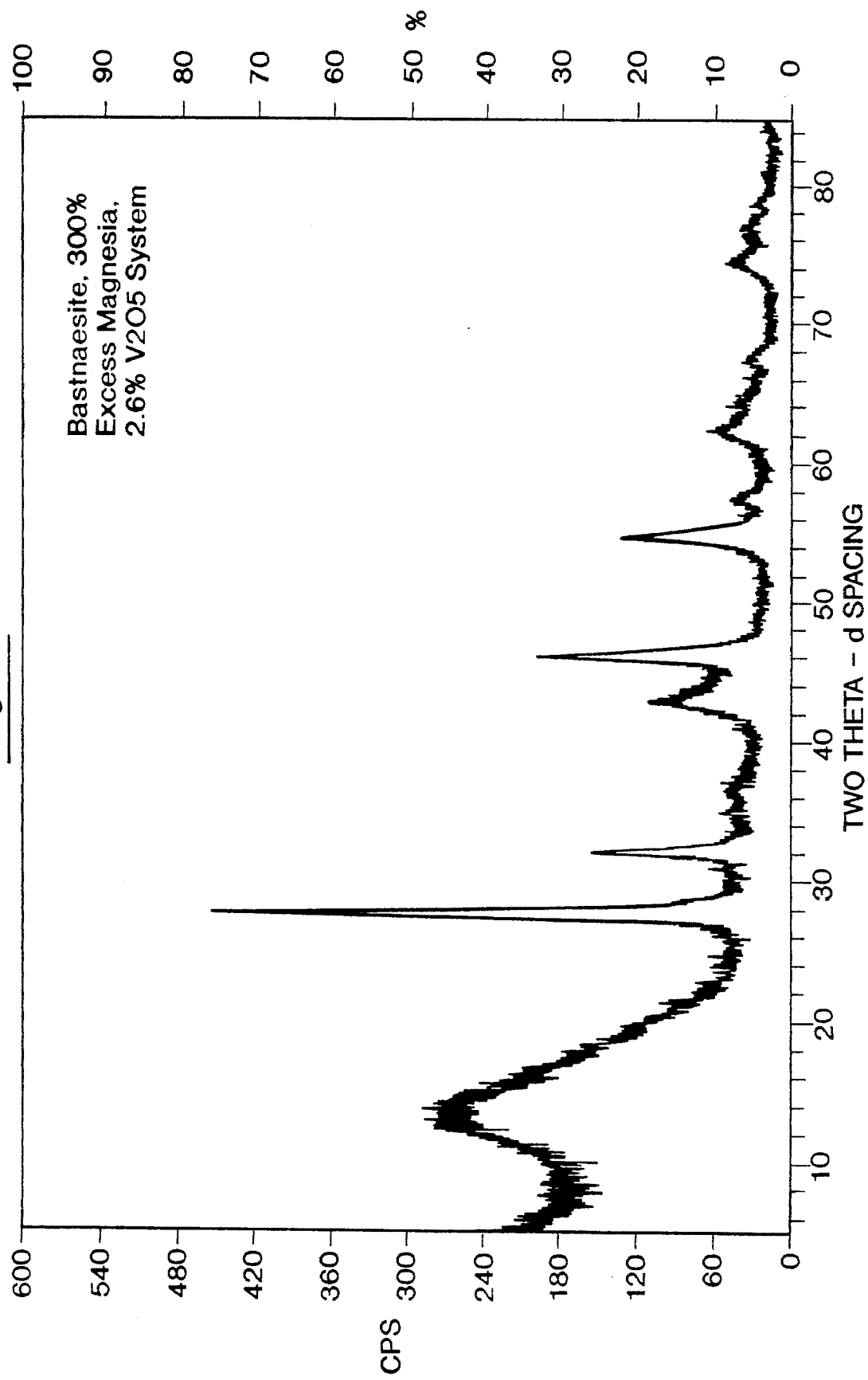
FIG. 7 depicts the XRD pattern for a bastnaesite/spinel-like compound containing 300% excess magnesia.

FIG. 7 depicts the XRD pattern for a bastnaesite/spinel-like compound containing 300% excess magnesia and 2.6 weight percent $V_2O_5$ $SO_x$ catalyst.

Figure 8:
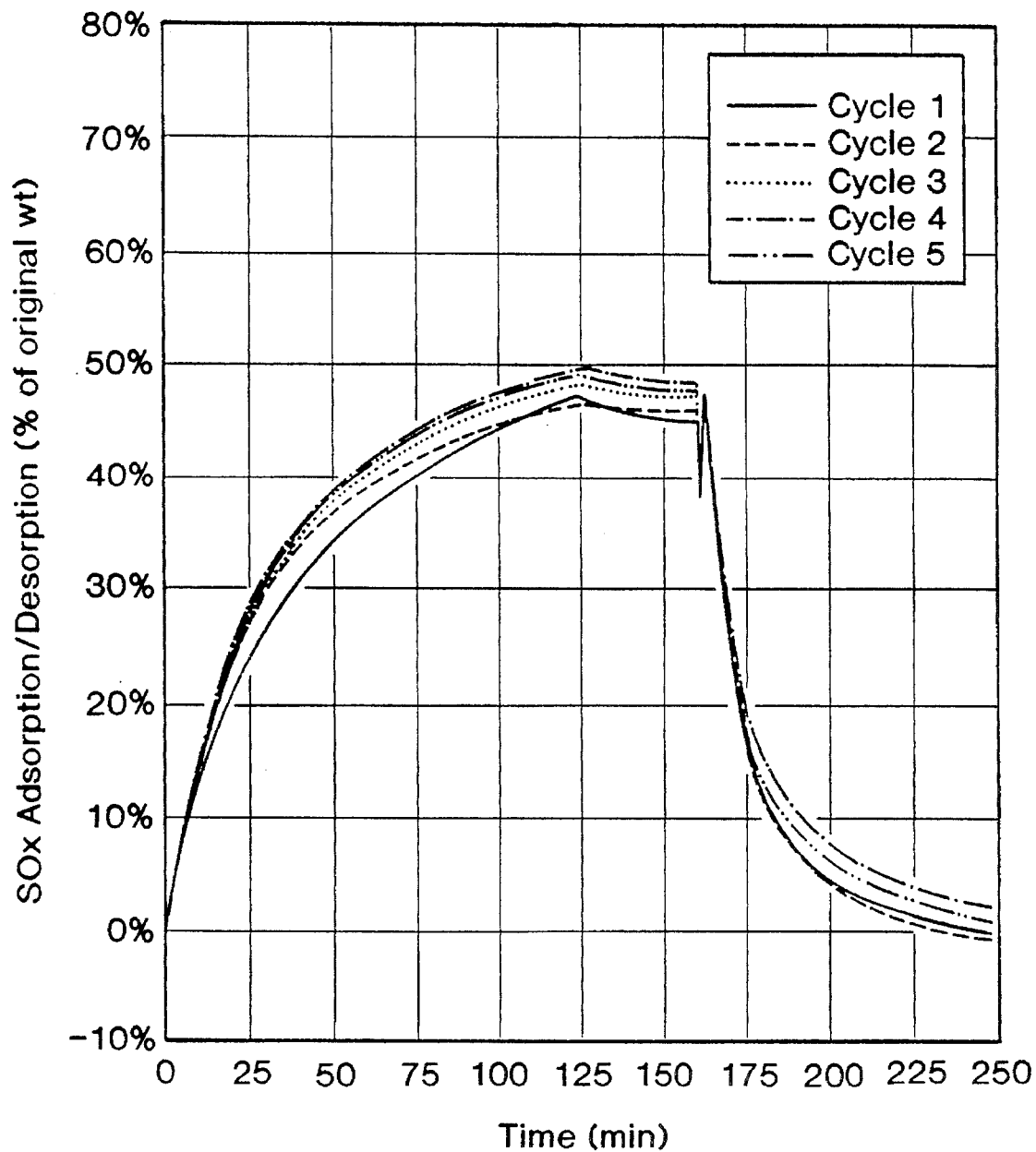
FIG. 8 gives data for extended TGA cyclic use for the bastnaesite/spinel-like compound containing 300% magnesia whose XRD pattern is depicted in FIG. 7.

FIG. 8 depicts extended (5 cycle regeneration) TGA cyclic use data for the bastnaesite/spinel-like compound having 300% excess magnesia whose XRD pattern is depicted in FIG. 7.

Figure 9:
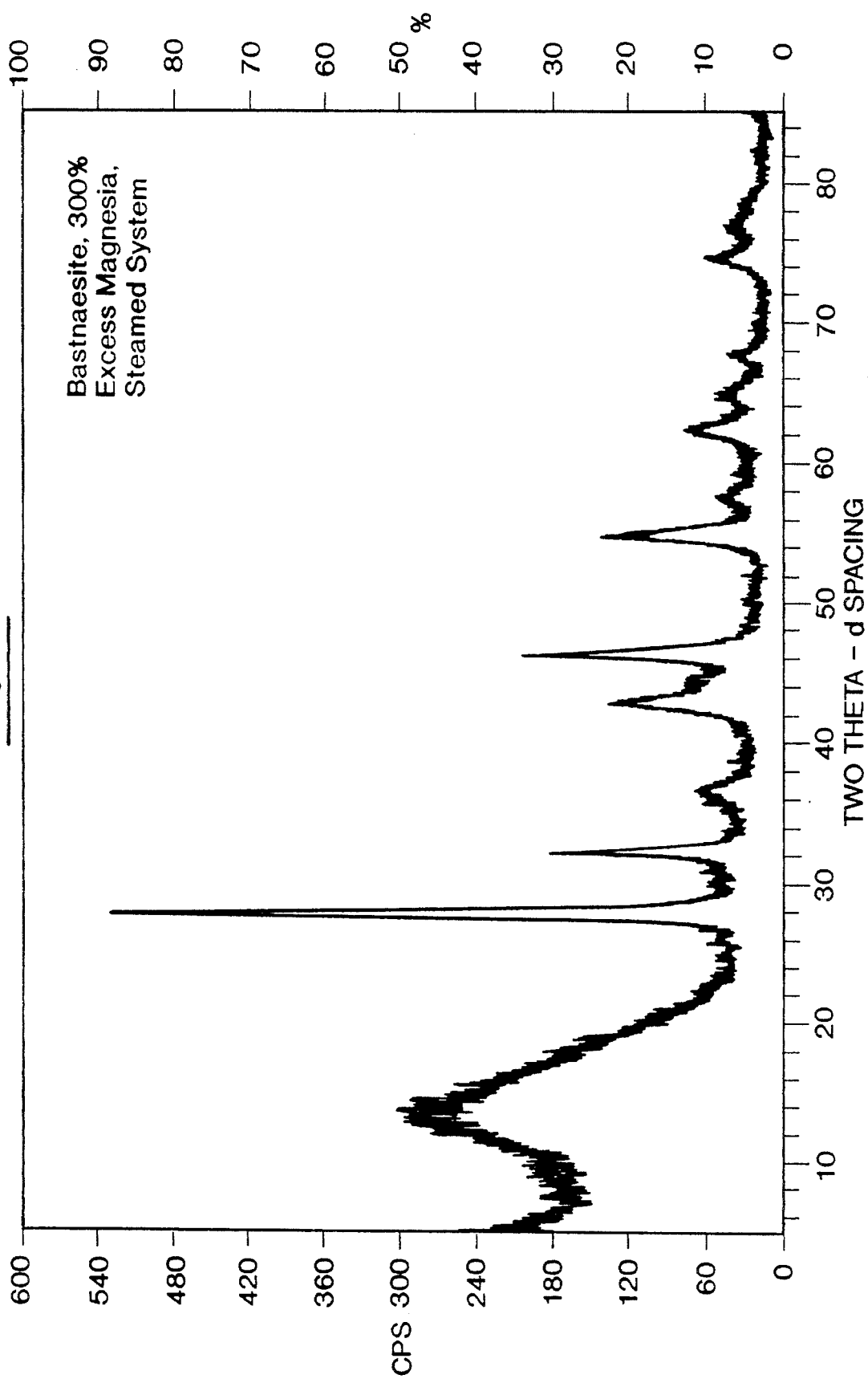
FIG. 9 depicts the XRD pattern for a bastnaesite/spinel-like compound containing 300% excess magnesia that has been subjected to high temperature steam treatment.

FIG. 9 depicts the XRD pattern for another bastnaesite/spinel-like compound containing 300% excess magnesia that has been subjected to high temperature steam deactivation.

Figure 10:
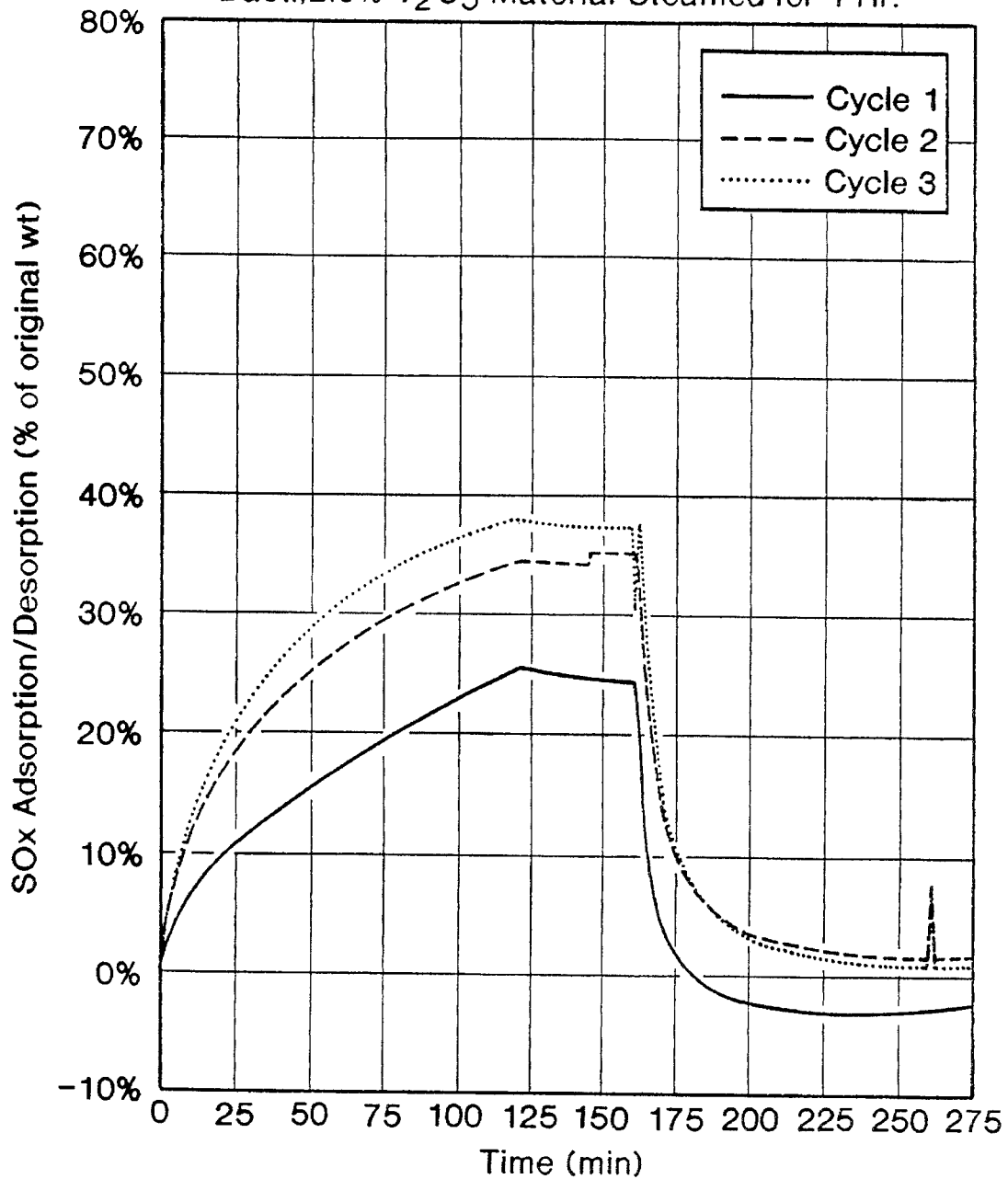
FIG. 10 depicts extended TGA cyclic use data for the bastnaesite/spinel-like compound containing 300% excess magnesia whose XRD pattern is depicted in FIG. 9 and which also was subjected to a high temperature steam treatment.

FIG. 10 depicts the extended TGA cyclic use data for the bastnaesite/spinel-like compound containing 300% excess magnesia that had been subjected to high temperature steaming and whose XRD pattern is depicted in FIG. 9. It also should be noted in passing that this steamed material exhibited the unusually advantageous property of improving in $SO_x$ absorption as it was cycled in these TGA apparatus.

FIG. 11 is the XRD pattern for a bastnaesite/spinel-like compound having a $MgO/Al_2O_3$ ratio of 2.2. The key peaks for the bastnaesite component and the magnesia component are labeled. For each of the spinel peaks the relative intensities for $MgAl_2O_4$ as defined by JCDP5 21-1152 are shown for comparative purposes.

FIG. 12 is the XRD pattern for a magnesia-rich spinel impregnated with ceria. The $MgO/Al_2O_3$ ratio of this material is 2.2. The key peaks for ceria and the magnesia component are labeled. Here again, for each of the spinel peaks the relative intensities for $MgAl_2O_4$ as defined by JCDP5 21-1152 are given.

Comparisons with Prior Art Materials

Applicant conducted a great many tests aimed at comparing the bastnaesite/alkaline-earth metal oxide materials (e.g., bastnaesite/magnesia-containing materials) produced by the methods of this patent disclosure with various prior art $SO_x$ additives. For example, they were compared with spinels, with bastnaesite alone, and/or with various metal oxide materials alone. These comparative $SO_x$ absorbance tests were based on laboratory TGA tests as well as large-scale pilot plant tests. The results of some comparative TGA tests are summarized in TABLE V.

TABLE V

| Sample Description | 2-θ | TGA $SO_x$ Absorption, %/Min |
|---|---|---|
| Spinel Alone | 64.9 | 0.083 |
| Spinel-Ceria (Ex. 14) | 64.8 | 0.21 |
| Bastnaesite Alone | | 0.13 |
| Unreacted Mixture of Bastnaesite And Spinel (see FIG. 4 and Ex. 1) | 64.7 | 0.10 |
| Chemically Bastnaesite/Spinel-Like Compound (see FIG. 2 and Ex. 6) | 65.2 | 0.16 |

Among other things, Table V shows that the representative "spinel" material, by itself, displays rather low activity with respect to $SO_x$ absorption (which is expressed in terms of percentage gain in weight of the test material per minute). That is, relatively speaking, the 0.083 TGA value given in Table V for spinel alone indicates relatively little $SO_x$ absorbance. However, the next line of Table V shows that when an effective $SO_x$ catalyst (i.e., ceria) is added to that same spinel, there is a very significant increase in $SO_x$ absorption. In other words, the 0.21 TGA value for the ceria-impregnated spinel represents a very significant increase in $SO_x$ absorption relative to the 0.083 value for the spinel alone. This kind of data was obtained for many different spinel and bastnaesite/alkaline-earth spinel-like materials. This line of experiments also forced applicant to conclude that, without a separate and distinct $SO_x$ catalyst such as ceria, vanadia, etc., to convert sulfur dioxide to sulfur trioxide, very little $SO_x$ is taken up by spinels in their own right because very little of the $SO_2$ is oxidized to $SO_3$ by a spinel alone. On the other hand, when the $SO_2$ is in fact converted to $SO_3$ (by the ceria), a spinel acts as a very good absorbent of $SO_3$ gas. The drawback, however, is that the ceria used to effect the $SO_2$ oxidation is a rather expensive catalyst ingredient; moreover, its presence in such a system also requires a separate (and costly) process step for removing the $NO_x$ formed in the flue gas during applicant's calcination step when ceria is present in a catalyst system.

Next, note that bastnaesite (as well as treated bastnaesite materials) by itself has significant $SO_x$ absorption activity (as evidenced by the 0.13 figure in the TGA tests shown in Table V). But this is true only for the first cycle, i.e., before "aging" becomes a factor. Such aging is best studied by pilot plant tests that involve the repeated use and regeneration of the test material. In any case, applicant's experimental programs (TGA as well as pilot plant) repeatedly confirmed that a mere mixing of bastnaesite materials with various alkaline-earth metal compounds results in only minor improvements in the $SO_x$ absorption ability of the resulting particle mixture. For example, Table V shows a value of 0.10 for such a mixture. As further evidence that a particular material behaves as a mixture of bastnaesite and alkaline-earth metals (as opposed to a chemically reacted bastnaesite/alkaline-earth metal compounds), one can calculate the weighted average of the contribution of the bastnaesite and alkaline-earth metal and obtain a value that is in virtually exact agreement with that measured for a bastnaesite particle, alkaline-earth metal particle mixture. Again, all such unreacted materials showed very rapid aging in the FCC pilot plant tests. Applicant believes this too is due to both the rapid aging of the bastnaesite and the rapid aging of the "unreacted" alkaline-earth metal component of such particle mixtures.

In contrast, applicant invariably found that when bastnaesite is chemically reacted with a alkaline earth metal compound (and especially magnesia) according to the teaching of this patent disclosure, very significant improvements are seen in the ability of the resulting compound to absorb $SO_x$ and to be regenerated. For example, the 0.16 TGA value for the chemically reacted bastnaesite/spinel-like compound shown in Table V is significantly higher than that of: (1) bastnaesite alone (even considered on a one-time-use basis, as opposed to repeated use, where it rapidly ages, (2) spinel alone, or (3) mere physical mixtures of bastnaesite and spinel. Indeed, the 0.16 value for the chemically reacted bastnaesite/spinel-like compound is close to the 0.22 value achieved by the far more expensive, cerium-impregnated spinel. Hence, this data shows that almost the same high levels of $SO_x$ absorbance TGA values (e.g., 0.16 versus 0.21) can be achieved at far less expense owing to the fact that ceria is a far more expensive ingredient than bastnaesite. It also bears repeating that in some of applicant's FCC pilot plant experiments, applicant's bastnaesite/spinel-like materials actually gave better results than many ceria-impregnated spinels when they were regenerated over extended periods of use (e.g., 48 hours).

Theoretical Suppositions

Applicant believes that use of the herein defined amounts of a mono-protonic acid produces effective bastnaesite/magnesia/alumina $SO_x$ absorbent/catalysts because it is preferred that the magnesia not be completely reacted with the alumina species in the reaction mixture and because use of these amounts of mono-protonic acids greatly encourages this effect. Applicant also is of the opinion that if sufficient magnesia is not available for reaction with the bastnaesite, then a material more in the nature of a simple physical mixture of bastnaesite and $MgO/Al_2O_3$ will result.

On the basis of this and a host of other experimental evidence, applicant also has concluded that in the preparation of the bastnaesite/alkaline-earth metal compounds of the present patent disclosure (i.e., those compounds obtained when bastnaesite is chemically reacted with at least one alkaline metal ingredient), it is the occurrence of a chemical reaction between the bastnaesite and at least one alkaline-earth metal (as opposed to say, a $R_2^{3+}[B]$ ingredient, e.g., alumina) that creates $SO_x$ absorbent/catalyst materials that are more effective in their ability to convert sulfur dioxide to sulfur trioxide and, more important, in their ability to be repeatedly regenerated with respect to their $SO_x$ absorbent ability.

Next, attention again should be called to the fact that many of the spinels used in applicant's comparative experiments had a 2-θ value of 65.2, which indicated that the material was a stoichiometric spinel and, hence, would be considered as relatively poor spinels in terms of their $SO_x$ absorbent abilities. Very surprisingly, however, such 65.2 XRD 2-θ value spinel-like components of applicant's bastnaesite/spinel-like compounds still produced excellent $SO_x$ absorption/catalyst when their ingredients were chemically reacted with bastnaesite. As indicated in Table V, applicant verified that such 65.2 2-θ spinel materials made rather poor $SO_x$ absorbents when they were merely mixed with bastnaesite. Also note that those factors that made for "good spineis" in certain prior art absorbents (i.e., those having 64.6 XRD 2-θ values), make far less active $SO_x$ additives when they are reacted with bastnaesite. Again, applicant's interpretation of this "inconsistency" (say, with the teachings of the '979 patent) is that if the $R^{2+}[A]$ and $R_2^{3+}[B]$ components of applicant's formulations (e.g., magnesia and alumina) are too closely associated during the initial reaction phase of preparation (by virtue of the small particle sizes of the alumina ingredient called for in the '979 patent), they do not interact as well with the bastnaesite and that this results in a material that behaves more like a physical mixture of a spinel and a bastnaesite.

In another line of TGA experiments, it was clearly established that the 100 percent excess magnesia limitation described in the Science and Technology reference is not applicable to applicant's compounds. To establish that this prior art limitation is not applicable to applicant's bastnaesite-containing compounds, it was necessary to set up cyclic test since the issue there is not the initial activity of the test material, but rather whether the activity can be sustained over repeated cycles of operation.

The results of these experiments are depicted in Table VI.

TABLE VI

| No. | Event | Temperature | Ramp/Time | Gas |
|---|---|---|---|---|
| 1 | Ramp | 25–700 C. | 10 C./min | Nitrogen |
| 2 | Isotherm | 700 C. | 15 min. | Nitrogen |
| 3 | Isotherm | 700 C. | 120 min. | $SO_x$ mix gas |
| 4 | Isotherm | 700 C. | 15 min. | Nitrogen |
| 5 | Ramp | 700 C.–593 C. | 10 C./min | Nitrogen |
| 6 | Isotherm | 593 C. | 15 min. | Nitrogen |
| 7 | Isotherm | 593 C. | 100 min. | Hydrogen |
| 8 | Isotherm | 593 C. | 15 min. | Nitrogen |
| 9 | Ramp Return to No. 2 | 593 C.–700 C. | 10 C./min | Nitrogen |

A typical pattern resulting from such tests is shown in FIG. 8. This particular pattern is for a bastnaesite/alkaline-earth metal oxide absorbent with a $MgO/Al_2O_3$ ratio of 4.0. During the first part of the test corresponding to step #3 of Table VI, the absorbent was exposed to the $SO_2$-containing gas for 120 minutes; this resulted in almost complete saturation of the absorbent with sulfur trioxide. The apparent drop in mass at the end of step #3 was due to small changes in the buoyancy of the sample as the gas was changed from the $SO_2$ mix to nitrogen. In a like manner, there was a sharp spike as the temperature was ramped down from 700° C. to 593° C. and hydrogen was introduced into the system. A very sharp drop in mass back to the baseline was then noted. This indicated that magnesium sulfate was being reduced to magnesia. The cycle was repeated over and over. A host of experiments like this very clearly demonstrated that the magnesia in the bastnaesite absorbents with $MgO/Al_2O_3$ ratios above 2.0 is readily regenerated.

Relationship to Hydrocarbon Cracking Catalysts

Applicant's thermogravimetric data and applicant's pilot plant data usually complemented each other to give further insights into the nature of the bastnaesite/alkaline-earth metal reactions under consideration. For example, in one set of comparative experiments, applicant's thermogravimetric data showed that bastnaesite, in and of itself, acts as a good $SO_x$ absorbent material—but only once (again, see Table V). That is, as bastnaesite, by itself, is repeatedly used as an $SO_x$ absorbent and regenerated, its $SO_x$ absorbent abilities decrease very quickly. This effect also was confirmed by applicant's large scale pilot plant experiments, which, by their very nature, were concerned with repeatedly using and regenerating. This occurred when bastnaesite particles were merely physically mixed with hydrocarbon cracking particles as the separate and distinct particle species were mixed together (or mixed in the same particles with the aid of binder materials such as kaolin clay, or mixed with hydrocarbon cracking catalysts to form composite hydrocarbon cracking/$SO_x$ absorbent particles). In effect, this pilot plant data serves to explain why, when bastnaesite is used as a $SO_x$ absorbent, large quantities of "make-up" bastnaesite must be continually added to the bulk catalyst of the FCC unit.

Applicant's comparative experimental program also established that many prior art hydrocarbon cracking catalysts that are commonly used in FCC units display some, albeit limited, ability to absorb $SO_x$. This is probably due to the widespread use of certain active forms of alumina in most FCC hydrocarbon cracking catalysts. However, this inability to absorb $SO_x$ generally follows in part from the fact that there are usually no catalyst materials in hydrocarbon cracking catalyst particles that are capable of converting sulfur dioxide to sulfur trioxide. In other words, many hydrocarbon cracking catalysts also could serve to absorb $SO_3$ if a catalyst for converting $SO_2$ to $SO_3$—such as that in applicant's bastnaesite/alkaline-earth compounds—also were used in conjunction with such hydrocarbon cracking catalysts. Several of applicant's experiments confirmed that this is indeed possible. Indeed, when applicant's bastnaesite/alkaline-earth $SO_x$ absorbent materials were in fact added to such hydrocarbon cracking systems, a wide variety of FCC hydrocarbon cracking catalyst (and especially so-called "bottoms cracking" catalysts) could then serve to absorb $SO_x$ as well as to perform their hydrocarbon cracking function. Applicant's materials can perform the $SO_2$-to-$SO_3$ catalyzing function particularly well and therefore can form the basis of overall catalyst systems comprised of a major amount (e.g., 95 to 99 percent by weight) of a hydrocarbon cracking system and a minor amount (e.g., 1 to 5 percent by weight) of applicant's bastnaesite/alkaline-earth compounds. Such catalyst systems may be comprised of separate $SO_x$ particles and hydrocarbon cracking particles, or of composite particles wherein the $SO_x$ additive particles and hydrocarbon cracking particles are "glued" together by use of various matrix-forming materials (e.g., clays, silica aluminates, etc.) well known in the FCC particle manufacturing arts. Also note that, in various FCC uses of applicant's $SO_x$ additives, the separate and distinct presence of a $SO_x$ oxidation catalyst species (e.g., as by use of cerium-impregnated particles) may be employed for the most economic utilization of all of the catalytic materials.

Particularly Preferred Procedures and Preparations

EXAMPLE 1

As part of applicant's overall research program, many different magnesium solutions were prepared that were thereafter used in the production of many different materials. One particularly preferred magnesium solution was formulated by adding 498 grams of glacial acetic acid to 554 milliliters of water. To the resulting mixture, 167 grams of magnesium oxide (which was obtained from Combustion Engineering, Inc., in the form of their MAGOX® product) were slowly added. The resulting mixture was then stirred until all of the magnesium oxide was dissolved.

EXAMPLE 2

Another highly preferred form of magnesium solution used in various versions of the herein described processes was prepared by adding 249 grams of glacial acetic acid to 803 milliliters of water. To the resulting mixture, 167 grams of magnesium oxide (obtained from Combustion Engineering, Inc., in the form of their MAGOX® product) were added. The mixture was then stirred for 30 minutes.

EXAMPLE 3

Applicant also used magnesium oxide as ingredients in slurry form in the overall practice of this invention. This slurry was prepared by adding 167 grams of magnesium oxide (obtained from Combustion Engineering, Inc., in the form of their MAGOX® product) to 1052 milliliters of water. The resulting slurry had to be mixed under high-speed shear conditions.

EXAMPLE 4

Some of applicant's most preferred alumina ingredients were those prepared by hydrolysis of aluminum alcoholates. The crystalline structure of these materials is best characterized as that of the mineral boehmite (alpha alumina monohydrate). However, within this broad definition there is a whole host of solid aluminas and sols that may be used in the preparation of these materials for their subsequent association with bastnaesite. Applicant also found that a particularly effective alumina for the practice of the herein described processes is Condea P-3® (obtained from Condea Chemie GMBH of Germany). Applicant also has prepared certain alumina-containing versions of these $SO_x$ catalysts with Grade SB® alumina (also obtained from Condea Chemie GMBH). Other suitable aluminas would include Catapal A®, Catapal B®, and Catapal C (which can be obtained from Vista Chemical Company). Within these general classes, there also were several grades of dispersible alumina powders that already had the required amount of monoprotonic acid for dispersion mixed with the alumina. Hence, these materials were merely stirred with water to form alumina sols. For example, these aluminas are available as part of a class of aluminas called "Disperal Special Aluminas®" from Condea Chemie GMBH of Germany, and as Dispal Alumina Sol from Vista Chemical Company. Another source of alpha alumina monohydrate having a crystalline structure and dispersibility similar to the above-noted commercial alumina products is the Versal Aluminas® obtained from the La Roche Chemical Company. Applicant would also note in passing that one particularly preferred way of preparing an alumina sol is to add glacial acetic acid to water. To this mixture, Condea P-3® alumina powder can be added while the mixture is stirred.

EXAMPLE 5

Some particularly preferred bastnaesite materials for preparation of applicant's total reaction compositions are: Grade 4000®, Grade 4010®, and Grade 4100® obtained from Molycorp, Inc. Grade 4000® is an unleached bastnaesite mineral. By way of comparison, Grade 4010® represents a bastnaesite that has been leached to remove some of its alkaline earth metals. Grade 4100 has been both leached and calcined. Of these materials, the Grade 4100 is somewhat preferred. It is best prepared by slurrying it to a 50 percent weight slurry.

Preparation of Certain Preferred Bastnaesite/Spinel Total Reaction Mixtures

EXAMPLE 6

To 2154 grams of alumina sol (as described in Example 4) were added 846 grams of magnesium acetate (as described in Example 1). The mixture was then stirred at high speed. To the resulting mixture, 846 grams of magnesium oxide slurry prepared by the procedure in Example 3 were added. A slurry of bastnaesite (prepared as in Example 5) was added to the mixture. The resulting slurry was spray dried and then calcined for one hour at 1350° F. The XRD pattern for this material showed a 2-θ value of 65.2. The ratio of spinel to magnesia was 6.5. Evaluation of this material on the TGA test showed an absorption of 0.16%/min.

EXAMPLE 7

An alumina sol was prepared by dispersing 204 grams of Condea P-3® powder in an acetic acid solution containing 8.5 grams of glacial acetic acid in 884 milliliters of water. To this sol, 814 grams of magnesia hydroxy acetate (prepared as in Example 2) were added. The resulting mixture was stirred at high speed. To this mixture, 206 grams of Molycorp Grade 4100® bastnaesite (prepared according to Example 5) were added and stirred at high speed. The resulting slurry was spray dried and then calcined for one hour at 1350° F. The XRD pattern for this material showed a 2-θ value of 64.6. The ratio of spinel to magnesia was 1.9. Evaluation of this material on the TGA showed an absorption of 0.10%/min.

EXAMPLE 8

An alumina sol was prepared by dispersing 204 grams of Condea SB® alumina in an acetic acid solution containing 9.2 grams of glacial acetic acid in 982 milliliters of water. To this sol, 869 grams of magnesia hydroxyacetate (prepared as in Example 2) were added. The resulting mixture was stirred at high speed. To this mixture, 221 grams of Molycorp Grade 4100 bastnaesite (prepared according to Example 5) were added and stirred at high speed. The resulting slurry was spray dried and then calcined for one hour at 1350° F. The XRD pattern for this material showed a 2-θ value of 65.14. The ratio of spinel to magnesia was 4.3. Evaluation of this material on the TGA showed an absorption of 0.16%/min.

EXAMPLE 9

A magnesia solution containing 13 percent weight magnesia was prepared by slurrying 119 grams of magnesia in 666 milliliters of water. To this slurry were added 84 grams of glacial acetic acid. The resulting slurry was added to 1150 grams of alumina sol prepared by the same formulation taught in Example 7. The mixture was stirred at high speed. To the mixture, 221 grams of Molycorp Grade 4100® bastnaesite (prepared as in Example 5) were added and stirred at high speed. The resulting slurry was spray dried and then calcined for one hour at 1350° F. The XRD pattern for the resulting material showed a 2-θ value of 65.04. The ratio of spinel to magnesia was 3.7. Evaluation of this material by the herein described TGA methods showed an absorption of 0.17%/min.

EXAMPLE 10

An alumina sol was prepared by dispersing 142 grams of Condea P-3® alumina powder in a solution of 2.9 grams of 70 percent weight nitric acid in 718 milliliters of water. A solution containing magnesium nitrate was prepared by dissolving 41 grams of magnesia in 174 grams of 70 percent nitric acid in 154 milliliters of water. This solution was added to the alumina sol and stirred at high speed. A slurry of magnesia in water was prepared by adding 41 grams of magnesia powder to 167 milliliters of water. This was added to the alumina and magnesium nitrate mixture. To this were added 153 grams of Molycorp Grade 4100® bastnaesite prepared according to Example 5. The resulting slurry was spray dried and then calcined for one hour at 1350° F. The XRD pattern for the resulting material showed a 2-θ value of 64.94. The ratio of spinel to magnesia was 3.9. Evaluation of this material on the TGA showed an absorption of 0.15%/min.

EXAMPLE 11

An alumina sol was prepared by dispersing 132 grams of Condea SB® alumina in a nitric acid solution containing 8.9 grams of 70 percent weight nitric acid in 539 milliliters of water. To this sol, 390 grams of a magnesium nitrate solution were added; the magnesia content of the solution was 20 percent weight. The resulting mixture was stirred at high speed. To this mixture, 72.8 grams Molycorp Grade 4100® bastnaesite (prepared according to the procedure in Example 5) were added and stirred at high speed. The resulting slurry was spray dried and then calcined for one hour at 1350° F. The XRD pattern for this material showed a 2-θ value of 65.13. The ratio of spinel to magnesia was 13.3. Evaluation of this material on the TGA showed an absorption of 0.16%/min.

EXAMPLE 12

An alumina sol was prepared by dispersing 188 grams of Condea P-3® powder in an acetic acid solution containing 8.5 grams of glacial acetic acid in 840 milliliters of water. To this sol, 584 grams of magnesium hydroxy acetate prepared according to the procedure in Example 2 were added. The resulting mixture was stirred at high speed. A mixture of 102 grams of Molycorp Grade 4100® bastnaesite (prepared according to the procedure in Example 5) and 288 grams of magnesium hydroxy acetate was added to the mixture of alumina sol and magnesium hydroxy acetate and stirred at high speed. The bastnaesite and magnesium hydroxy acetate had been previously prepared and aged for one hour. The final slurry was spray dried and then calcined for one hour at 135° F. The XRD pattern for this material showed a 2-θ value of 64.82. The ratio of spinel to magnesia was 6.7. Evaluation of this material on the TGA showed an absorption of 0.13%/min.

EXAMPLE 13

An alumina sol was prepared following the procedure in Example 4. To 431 grams of this sol were added 338 grams of magnesium hydroxy acetate prepared according to the procedure in Example 2. The resulting mixture was stirred to produce a uniform gel. This material was dried at 500° F. in a muffle and then calcined for one hour at 1350° F. The XRD pattern for this material showed a 2-θ value of 64.93. The ratio of spinel to alumina was 2.0. Evaluation of this material on the TGA showed an absorption of 0.08%/min.

EXAMPLE 14

An alumina sol was prepared following the procedure in Example 4. To 379 grams of this sol were added 298 grams of magnesium hydroxy acetate prepared according to the procedure in Example 2. The resulting mixture was stirred to produce a uniform gel. To this gel, 44.4 grams of Molycorp Grade 5370 Cerium Nitrate were added and stirred to produce a uniform mixture. This material was dried at 500° F. in a muffle and then calcined for one hour at 1350° F. The XRD pattern for this material showed a 2-θ value of 64.77. The ratio of spinel to magnesia as 2.6. Evaluation of this material on the TGA showed an absorption of 0.21%/min.

EXAMPLE 15

An alumina sol was prepared by dispersing 34.2 grams of Condea P-3® powder in an acetic acid solution containing 1.5 grams of glacial acetic acid in 258.4 milliliters of water. This alumina sol was added to 218.2 grams of magnesia hydroxy acetate prepared by dissolving 40.5 grams of magnesia in 63.8 grams of glacial acetic acid in 114 grams of water. The resulting mixture was stirred at high speed. To this mixture was added 13.1 grams of Grade 4100 bastnaesite slurried in 50.1 grams of water. After the bastnaesite addition, 23.3 grams of a solution containing 12.4 percent by weight of vanadium pentoxide was added. The resulting slurry was dried at 240° F. overnight and then was calcined for one hour at 1350° F. The X-ray diffraction pattern for this material showed a 2-θ value of 64.25. The percent spinel in the sample after aging in the TGA test was 43 percent by weight.

EXAMPLE 16

An alumina sol was prepared by dispersing 28.9 grams of Condea P-3® powder in an acetic acid solution containing 1.3 grams of glacial acetic acid in 219.2 grams of water. This alumina sol was added to 246 grams of magnesia hydroxy acetate prepared by dissolving 45.8 grams of magnesia in 71.6 grams of glacial acetic acid in 128.6 grams of water. The resulting mixture was stirred at high speed. To this mixture was added 13.1 grams of Grade 4100 bastnaesite slurried in 50.1 grams of water. After the bastnaesite addition 23.3 grams of a solution containing 12.4 percent by weight vanadium pentoxide was added. The resulting slurry was dried at 240° F. overnight and then was calcined for one hour at 1350° F. The X-ray diffraction pattern for this material showed a 2-θ value of 63.39. The percent spinel in the sample after aging in the TGA test was 34 percent by weight.

Thus, while applicant's invention has been described with respect to various scientific theories, specific examples, and a spirit that is committed to the concept of the occurrence of a chemical reaction between the bastnaesite and one or more alkaline-earth metal compounds, it is to be understood that this invention is not limited thereto, but rather only should be limited by the scope of the following claims.

Thus having described my invention, what is claimed is:

1. A process for making a chemically reacted, bastnaesite/magnesium oxide/alumina compound, said process comprising: (1) dispersing alumina in a liquid medium that also contains between about 0.5 and about 10.0 milliequivalents of a monoprotonic acid per gram of alumina to create an alumina sol; (2) mixing a magnesium compound with bastnaesite to form a bastnaesite/magnesium compound and then mixing the bastnaesite/magnesium compound with the alumina sol and thereby creating a bastnaesite/magnesium/alumina total reaction composition; (3) spray drying the bastnaesite/magnesium/alumina total reaction composition to produce a solid solution material; and (4) calcining the solid solution material resulting from the spray drying to produce a bastnaesite/magnesium oxide/alumina compound.

2. The process of claim 1 wherein the magnesium compound is selected from the group consisting of magnesium acetate, magnesium hydroxyacetate, magnesium nitrate, magnesium hydroxynitrate, magnesium oxide, magnesium ethylate, and magnesium ethoxide.

3. The process of claim 1 wherein the magnesium compound is magnesium acetate.

4. The process of claim 1 wherein the alumina is derived from alpha-alumina monohydrate.

5. The process of claim 1 wherein the mono-protonic acid is selected from the group consisting of nitric acid, acetic acid, and formic acid.

6. The process of claim 1 wherein about 3.0 milliequivalents of the mono-protonic acid per gram of alumina are employed.

7. The process of claim 1 wherein the calcining is done in a temperature range between about 1000 degrees Fahrenheit and about 1950 degrees Fahrenheit for from about 60 minutes to about 240 minutes.

8. The process of claim 1 wherein bastnaesite constitutes from about 5 weight percent to about 50 weight percent of the bastnaesite/magnesium oxide/alumina compound.

9. The process of claim 1 wherein an additional $SO_x$ catalyst material is combined with the total reaction composition.

10. The process of claim 1 wherein soluble forms of cerium and soluble forms of vanadium are combined with the total reaction composition.

11. The process of claim 1 wherein cerium nitrate and ammonium meta-vanadate are combined with the total reaction composition.

12. The process of claim 1 wherein the bastnaesite/magnesium oxide/alumina compound is impregnated with $SO_x$ catalyst compounds selected from the group consisting of soluble forms of ceria and soluble forms of vanadia.

13. The process of claim 1 wherein the bastnaesite/magnesium oxide/alumina compound is steamed.

14. A process for making a chemically reacted, bastnaesite/magnesium oxide/alumina compound, said process comprising: (1) dispersing alumina in a liquid medium provided with between about 0.5 milliequivalent and about 10.0 milliequivalents of a monoprotonic acid per gram of alumina to produce an alumina sol; (2) mixing a magnesium compound with the alumina sol and thereby creating a magnesium/alumina gel; (3) mixing bastnaesite with the magnesium/alumina gel and thereby creating a bastnaesite/magnesium/alumina total reaction composition; (4) spray drying the bastnaesite/magnesium/alumina total reaction composition to produce a solid material; and (5) calcining the solid material to produce a bastnaesite/magnesium oxide/alumina compound.

15. The process of claim 14 wherein the magnesium compound is selected from the group consisting of magnesium acetate, magnesium hydroxyacetate, magnesium nitrate, magnesium hydroxynitrate, magnesium oxide, magnesium ethylate, and magnesium ethoxide.

16. The process of claim 14 wherein the magnesium compound is magnesium acetate.

17. The process of claim 14 wherein the alumina is derived from alpha-alumina monohydrate.

18. The process of claim 14 wherein the mono-protonic acid is selected from the group consisting of nitric acid, acetic acid, and formic acid.

19. The process of claim 14 wherein about 3.0 milliequivalents of the mono-protonic acid per gram of alumina are employed.

20. The process of claim 14 wherein the calcining is done in a temperature range between about 1000 degrees Fahrenheit and about 1950 degrees Fahrenheit for from about 60 minutes to about 240 minutes.

21. The process of claim 14 wherein bastnaesite constitutes from about 5 weight percent to about 50 weight percent of the bastnaesite/magnesium oxide/alumina compound.

22. The process of claim 14 wherein an additional $SO_x$ catalyst material is combined with the total reaction composition.

23. The process of claim 14 wherein soluble forms of cerium and soluble forms of vanadium are combined with the total reaction composition.

24. The process of claim 14 wherein cerium nitrate and ammonium meta-vanadate are combined with the total reaction composition.

25. The process of claim 14 wherein the bastnaesite/magnesium oxide/alumina compound is impregnated with $SO_x$ catalyst compounds selected from the group consisting of soluble forms of ceria and soluble forms of vanadia.

26. The process of claim 14 wherein the bastnaesite/magnesium oxide/alumina compound is steamed.

27. The process of claim 14 wherein a hydrocarbon cracking catalyst is combined with the bastnaesite/magnesium oxide/alumina compound by use of a catalyst binder material that binds hydrocarbon cracking catalyst particles to bastnaesite/magnesium oxide/alumina compound particles to produce a composite particle.

28. A process for making a chemically reacted, bastnaesite/magnesium compound/alumina compound, said process comprising: (1) dispersing an alumina compound in a liquid medium provided with between about 0.5 milliequivalent and about 10.0 milliequivalents of a mono-protonic acid per gram of alumina to produce an alumina sol; (2) mixing a first portion of a magnesium compound with bastnaesite to produce a bastnaesite/magnesium material and allowing said bastnaesite/magnesium material to age; (3) mixing a second portion of the magnesium compound with the alumina sol and thereby creating a magnesium/alumina gel; (4) mixing the bastnaesite/magnesium material with the magnesium/alumina gel to create a bastnaesite/magnesium/alumina total reaction composition; (5) spray drying the bastnaesite/magnesium/alumina total reaction composition to produce a solid material; and (6) calcining the solid material to produce a bastnaesite/magnesium oxide/alumina compound.

29. The process of claim 28 wherein the bastnaesite/magnesium material is aged for about one hour.

30. The process of claim 28 wherein an the magnesium compound is selected from the group consisting of magnesium acetate, magnesium hydroxyacetate, magnesium nitrate, magnesium hydroxynitrate, magnesium oxide, magnesium ethylate, and magnesium ethoxide.

31. The process of claim 28 wherein the alumina is derived from alpha-alumina monohydrate.

32. The process of claim 28 wherein the magnesium compound is magnesium acetate.

33. The process of claim 28 wherein the mono-protonic acid is selected from the group consisting of nitric acid, hydrochloric acid, acetic acid, and formic acid.

34. The process of claim 28 wherein about 5.0 milliequivalents of the mono-protonic acid per gram of alumina are employed.

35. The process of claim 28 wherein the calcining is done in a temperature range between about 1000 degrees Fahrenheit and about 1950 degrees Fahrenheit for from about 60 minutes to about 240 minutes.

36. The process of claim 28 wherein the bastnaesite constitutes from about 5 weight percent to about 50 weight percent of the bastnaesite/magnesia oxide/alumina compound.

37. The process of claim 28 wherein an additional $SO_x$ catalyst material is combined with the total reaction composition.

38. The process of claim 28 wherein soluble forms of cerium and soluble forms of vanadium are combined with the total reaction composition.

39. The process of claim 28 wherein cerium nitrate and ammonium meta-vanadate are combined with the total reaction composition.

40. The process of claim 28 wherein the bastnaesite/magnesium oxide/alumina compound is impregnated with a $SO_x$ catalyst.

41. The process of claim 28 wherein the bastnaesite/magnesium oxide/alumina compound is impregnated with $SO_x$ catalyst compounds selected from the group consisting of soluble forms of ceria and soluble forms of vanadia.

42. The process of claim 28 wherein the bastnaesite/magnesium oxide/alumina compound is steamed.

43. The process of claim 28 wherein a hydrocarbon cracking catalyst is combined with the bastnaesite/magnesium oxide/alumina compound by use of a catalyst binder material that binds hydrocarbon cracking catalyst particles to bastnaesite/magnesium oxide/alumina compound particles to produce a composite particle.

44. A compound comprised of bastnaesite that is chemically reacted with magnesia and further comprising an alumina component.

45. The compound of claim 44 wherein the magnesia constitutes from 50 to 95 weight percent of said compound.

46. The compound of claim 44 that is comprised of bastnaesite that is chemically reacted with magnesia and alumina.

47. The compound of claim 44 that is a bastnaesite/magnesia/alumina compound having a magnesia component greater in amount than that needed to make a stoichiometric spinal component.

48. The compound of claim 44 made in particulate form suitable for use in a fluid catalytic cracking unit.

49. The compound of claim 44 wherein a bastnaesite component of said compound constitutes from about 5 weight percent to about 50 weight percent of said compound.

50. The compound of claim 44 which further comprises an additional $SO_x$ catalyst material selected from the group consisting of ceria, vanadium and platinum.

* * * * *